United States Patent
Ohura et al.

(10) Patent No.: US 12,215,902 B2
(45) Date of Patent: Feb. 4, 2025

(54) SUPPORT SYSTEM THAT SUPPORTS DESIGN OR CONSTRUCTION OF A REFRIGERANT CYCLE APPARATUS

(71) Applicant: DAIKIN INDUSTRIES, LTD., Osaka (JP)

(72) Inventors: Ryuuta Ohura, Osaka (JP); Takuya Kotani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 516 days.

(21) Appl. No.: 17/435,914

(22) PCT Filed: Mar. 4, 2020

(86) PCT No.: PCT/JP2020/009204
§ 371 (c)(1),
(2) Date: Sep. 2, 2021

(87) PCT Pub. No.: WO2020/179827
PCT Pub. Date: Sep. 10, 2020

(65) Prior Publication Data
US 2022/0235975 A1    Jul. 28, 2022

(30) Foreign Application Priority Data

Mar. 4, 2019 (JP) ................................ 2019-038569
Apr. 4, 2019 (JP) ................................ 2019-071896

(51) Int. Cl.
*F25B 41/24* (2021.01)
*F24F 11/36* (2018.01)
(Continued)

(52) U.S. Cl.
CPC .............. *F25B 41/24* (2021.01); *F24F 11/36* (2018.01); *F25B 13/00* (2013.01); *F25B 49/005* (2013.01);
(Continued)

(58) Field of Classification Search
CPC ........ F25B 41/24; F25B 13/00; F25B 49/005; F25B 49/02; F25B 2313/0233;
(Continued)

(56) References Cited

U.S. PATENT DOCUMENTS 7,606,683 B2    10/2009    Bahel et al.
9,933,205 B2    4/2018    Hatomura et al.
(Continued)

FOREIGN PATENT DOCUMENTS

EP    3467406 A1    4/2019
EP    3764008 A1    1/2021
(Continued)

OTHER PUBLICATIONS

International Preliminary Report on Patentability issued in corresponding International Application No. PCT/JP2020/009202 dated Sep. 16, 2021 (11 pages).

(Continued)

*Primary Examiner* — Elizabeth J Martin
(74) *Attorney, Agent, or Firm* — Osha Bergman Watanabe & Burton LLP

(57) ABSTRACT

A support system includes a display and a server. Upon acquiring first information on arrangement of a first refrigerant shut-off unit, second information on each of utilization-side units in a first utilization-side unit group, and third information on one of or both a length and an internal volume of the first connection pipe group, the server determines, based on an allowable leakage amount of the refrigerant into a space where a corresponding one or more utilization-side units is installed, whether the first, second, and third information are suitable for the design, and causes the display to display a result of the determination; or the server calculates a first refrigerant amount as a sum of an amount of the refrigerant in the first refrigerant circuit and (Continued)

an amount of the refrigerant, and causes the display to display the first refrigerant amount.

11 Claims, 19 Drawing Sheets

(51) Int. Cl.
  *F25B 13/00* (2006.01)
  *F25B 49/00* (2006.01)
  *F25B 49/02* (2006.01)
(52) U.S. Cl.
  CPC ...... *F25B 49/02* (2013.01); *F25B 2313/0233* (2013.01); *F25B 2400/121* (2013.01); *F25B 2500/19* (2013.01); *F25B 2500/222* (2013.01)
(58) Field of Classification Search
  CPC ............ F25B 2400/121; F25B 2500/19; F25B 2500/222; F24F 11/36
  See application file for complete search history.

(56) References Cited

U.S. PATENT DOCUMENTS

| | | | |
|---|---|---|---|
| 2005/0165591 A1* | 7/2005 | Bahel | F25B 49/00 703/7 |
| 2014/0033754 A1* | 2/2014 | Hatomura | F25D 29/006 62/190 |
| 2018/0180338 A1 | 6/2018 | Honda et al. | |

FOREIGN PATENT DOCUMENTS

| | | |
|---|---|---|
| JP | H11063745 A | 3/1999 |
| JP | 2017009267 A | 1/2017 |
| JP | 2018077040 A | 5/2018 |
| JP | 6632760 B1 | 1/2020 |
| WO | 2017203606 A1 | 11/2017 |

OTHER PUBLICATIONS

International Preliminary Report on Patentability issued in corresponding International Application No. PCT/JP2020/009204 dated Sep. 16, 2021 (7 pages).
Extended European Search Report issued in related European Patent Application No. 20765508.5, dated Oct. 18, 2022 (8 pages).
Extended European Search Report issued in corresponding European Patent Application No. 20766726.2, dated Oct. 14, 2022 (9 pages).
International Search Report issued in corresponding International Application No. PCT/JP2020/009202, mailed Apr. 14, 2020, with translation (4 pages).
International Search Report issued in corresponding International Application No. PCT/JP2020/009204, mailed Apr. 14, 2020, with translation (5 pages).

* cited by examiner

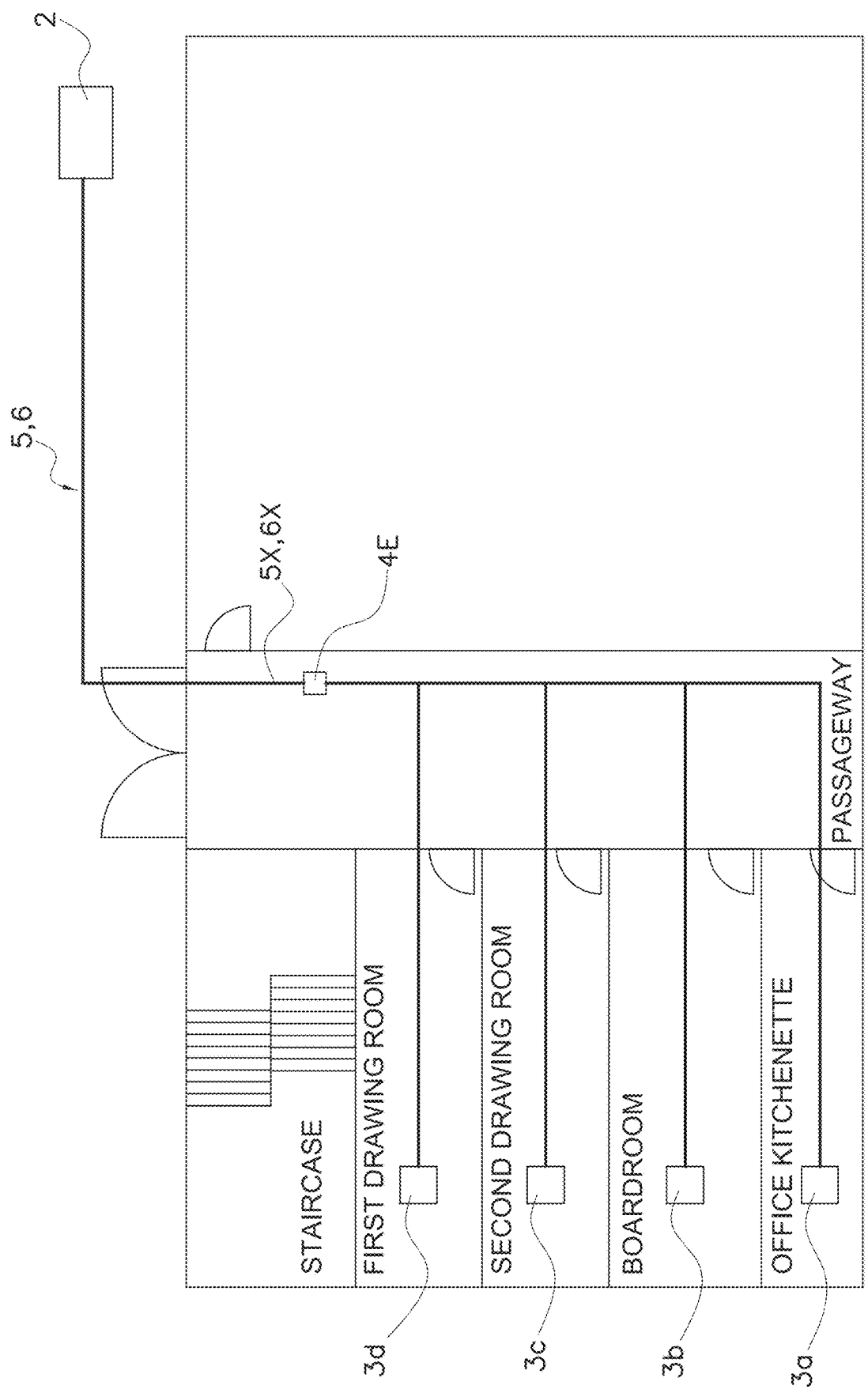

| ROOM AREA | LEAKAGE HEIGHT (INSTALLATION HEIGHT) |
|---|---|
| 20 m² | 2.2 m |
| 25 m² | 2.4 m |
| 30 m² | 2.6 m |
| 35 m² | 2.8 m |

A15

SYSTEM NAME: DRAWING ROOM SYSTEM (NOT AFFECT PIPE SELECTION AND CALCULATION)
SINGLE MODEL NAME
(NUMBERS ARE ASSIGNED IN ORDER FROM THE LEFT IN THE FIGURE)

1.   3.
2.   4.

INDOOR UNIT CONNECTION INFORMATION
CONNECTABLE NUMBER: 25
TOTAL CAPACITY RANGE: 14 ~ 36.4 kW
INPUT TOTAL VALUE: 26.3 kW

CHECK

| INDOOR UNIT | MODEL NAME FOR DISPLAY | SYSTEM SYMBOL | ROOM NAME | REMOTE CONTROLLER |
|---|---|---|---|---|
| FXYFP28DA | | PAC1-1-1 | FIRST DRAWING ROOM | |
| FXYFP36DA | | PAC1-1-2 | SECOND DRAWING ROOM | |

A14
A14b

SUPPORT SYSTEM THAT SUPPORTS DESIGN OR CONSTRUCTION OF A REFRIGERANT CYCLE APPARATUS

BACKGROUND

Technical Field

The present disclosure relates to a support system for supporting one of or both design and construction of a refrigerant cycle apparatus.

Related Art

Patent Literature 1 discloses an air conditioning system including a refrigerant shut-off valve. The refrigerant shut-off valve is closed when leakage of a refrigerant is detected. The refrigerant shut-off valve is disposed on a refrigerant connection pipe connecting a heat source-side unit and a utilization-side unit.

PATENT LITERATURE

Patent Literature 1: JP 2017-009267 A

In a refrigerant cycle apparatus of an air conditioning system or the like, the use of a shut-off valve is effective in case of occurrence of leakage of a refrigerant from a utilization-side unit into a space where someone is present.

However, heretofore, an idea of blocking a refrigerant at a location as close as possible to a utilization-side unit has become a common-sense approach, and no specific consideration has been given to arrangement of a shut-off unit for blocking the refrigerant. No consideration has been given to arrangement of a shut-off unit particularly in a refrigerant cycle apparatus including a common shut-off unit for a plurality of utilization-side units.

SUMMARY

One or more embodiments provide a support system for supporting one of or both design and construction of a refrigerant cycle apparatus. The refrigerant cycle apparatus includes a plurality of utilization-side units, a heat source-side unit, a connection pipe group, and a refrigerant shut-off unit. Each of the utilization-side units includes a first refrigerant circuit. The heat source-side unit includes a second refrigerant circuit. The connection pipe group is a group of connection pipes connecting the first refrigerant circuit and the second refrigerant circuit. The refrigerant shut-off unit is disposed between the first refrigerant circuit and the second refrigerant circuit, and is configured to block (shut off) a refrigerant flowing through the connection pipe group. The plurality of utilization-side units include a first utilization-side unit group. The first utilization-side unit group is a group of N (N: an integer equal to or more than two) utilization-side units. The refrigerant shut-off unit includes a first refrigerant shut-off unit. The first refrigerant shut-off unit is configured to block a flow of the refrigerant between the first refrigerant circuit in the first utilization-side unit group and the second refrigerant circuit. The connection pipe group includes a first connection pipe group. The first connection pipe group is a group of connection pipes connecting the first refrigerant circuit in the first utilization-side unit group and the first refrigerant shut-off unit.

The support system according to one or more embodiments includes an information acquisition unit and a presentation unit. The information acquisition unit is configured to acquire at least two of first information, second information, and third information. The first information concerns arrangement of the first refrigerant shut-off unit. The second information concerns each of the utilization-side units in the first utilization-side unit group. The third information concerns one of or both a length and an internal volume of the first connection pipe group. The presentation unit presents useful information based on at least the information acquired by the information acquisition unit.

(1) When the information acquisition unit acquires two of the first information, the second information, and the third information, the presentation unit calculates one of the first information, the second information, and the third information, which is not acquired by the information acquisition unit, and presents the calculated information as the useful information.

(2) When the information acquisition unit acquires the first information, the second information, and the third information, the presentation unit makes a determination as to appropriateness of the first information, second information, and third information, in view of allowable leakage of the refrigerant into a space where a corresponding one or more utilization-side units in the first utilization-side unit group is installed, and presents a result of the determination as the useful information.

(3) When the information acquisition unit acquires the first information, the second information, and the third information, the presentation unit calculates a first refrigerant amount as a sum of an amount of the refrigerant in the first refrigerant circuit in the first utilization-side unit group and an amount of the refrigerant in the first connection pipe group, and presents the first refrigerant amount as the useful information.

In the support system according to one or more embodiments, the presentation unit presents the useful information (1), the useful information (2), or the useful information (3). This configuration therefore enables one of or both design and construction of the refrigerant cycle apparatus, using the useful information. In particular, the support system according to one or more embodiments appropriately or simply fixes (determines) arrangement of the first refrigerant shut-off unit.

In the support system according to one or more embodiments, the second information includes installation space information and refrigerant amount information. The installation space information concerns the space where the corresponding one or more utilization-side units in the first utilization-side unit group is installed. The refrigerant amount information concerns the amount of the refrigerant in the first refrigerant circuit in the first utilization-side unit group. When the information acquisition unit acquires the second information and the third information, the presentation unit calculates the arrangement of the first refrigerant shut-off unit, as the first information. The presentation unit calculates the arrangement of the first refrigerant shut-off unit such that the first refrigerant amount is smaller than an allowable refrigerant leak amount in the space where the corresponding one or more utilization-side units in the first utilization-side unit group is installed. The first refrigerant amount corresponds to the sum of the amount of the refrigerant in the first refrigerant circuit in the first utilization-side unit group and the amount of the refrigerant in the first connection pipe group.

In the support system according to one or more embodiments, the arrangement of the first refrigerant shut-off unit is acquired as the useful information.

In the support system according to one or more embodiments, the second information includes installation space information and refrigerant amount information. The installation space information concerns the space where the corresponding one or more utilization-side units in the first utilization-side unit group is installed. The refrigerant amount information concerns the amount of the refrigerant in the first refrigerant circuit in the first utilization-side unit group. When the information acquisition unit acquires the first information, the second information, and the third information, the presentation unit makes a determination as to appropriateness of the first information, second information, and third information. The presentation unit makes the determination as to the appropriateness of the first information, second information, and third information, by determining whether the first refrigerant amount is smaller than an allowable refrigerant leak amount in the space where the corresponding one or more utilization-side units in the first utilization-side unit group is installed. The first refrigerant amount corresponds to the sum of the amount of the refrigerant in the first refrigerant circuit in the first utilization-side unit group and the amount of the refrigerant in the first connection pipe group.

In the support system according to one or more embodiments, a result of the determination as to the appropriateness of the first information, second information, and third information is acquired as the useful information.

In the support system according to one or more embodiments, when the information acquisition unit acquires the first information, the second information, and the third information, the presentation unit calculates the amount of the refrigerant in the first refrigerant circuit in the first utilization-side unit group and the amount of the refrigerant in the first connection pipe group based on a thermal environment of a place where the refrigerant cycle apparatus is installed, and calculates the first refrigerant amount as the sum of the calculated amounts.

In the support system according to one or more embodiments, the first refrigerant amount is calculated based on the thermal environment of the place where the refrigerant cycle apparatus is installed. This case enables acquisition of, as the useful information, an appropriate calculation result of the first refrigerant amount according to an installation place, as compared with a case where the first refrigerant amount is calculated based on a condition of an excessive thermal environment.

In the support system according to one or more embodiments, the refrigerant flowing through the first refrigerant circuit, the second refrigerant circuit, and the connection pipe group has flammability. The allowable refrigerant leak amount in the space where the corresponding one or more utilization-side units in the first utilization-side unit group is installed corresponds to an allowable refrigerant leak amount in a first room. The first room has a smallest spatial volume among one or more rooms where one of the utilization-side units in the first utilization-side unit group is or the utilization-side units in the first utilization-side unit group are installed. The allowable refrigerant leak amount in the first room is set such that a concentration of the refrigerant in the first room is within LFL (a lower flammability limit) of the refrigerant/safety factor.

In the support system according to one or more embodiments, the refrigerant flowing through the first refrigerant circuit, the second refrigerant circuit, and the connection pipe group is a mildly flammable refrigerant, a lower flammability refrigerant, or a higher flammability refrigerant. The mildly flammable refrigerant is classified as "Class 2L" in U.S. ANSI/ASHRAE Standard 34-2013. The lower flammability refrigerant is classified as "Class 2" in U.S. ANSI/ASHRAE Standard 34-2013. The higher flammability refrigerant is classified as "Class 3" in U.S. ANSI/ASHRAE Standard 34-2013.

BRIEF DESCRIPTION OF THE DRAWINGS

FIG. 3E is a diagram of exemplary arrangement E of the heat source-side unit, the utilization-side units, and the relay unit.

FIG. 7C is a partially enlarged diagram of FIG. 7B.

FIG. 7D is a diagram of an exemplary display screen by the computer program in the design support system.

DETAILED DESCRIPTION (1) Configuration of Air Conditioning Apparatus

Figure 1:
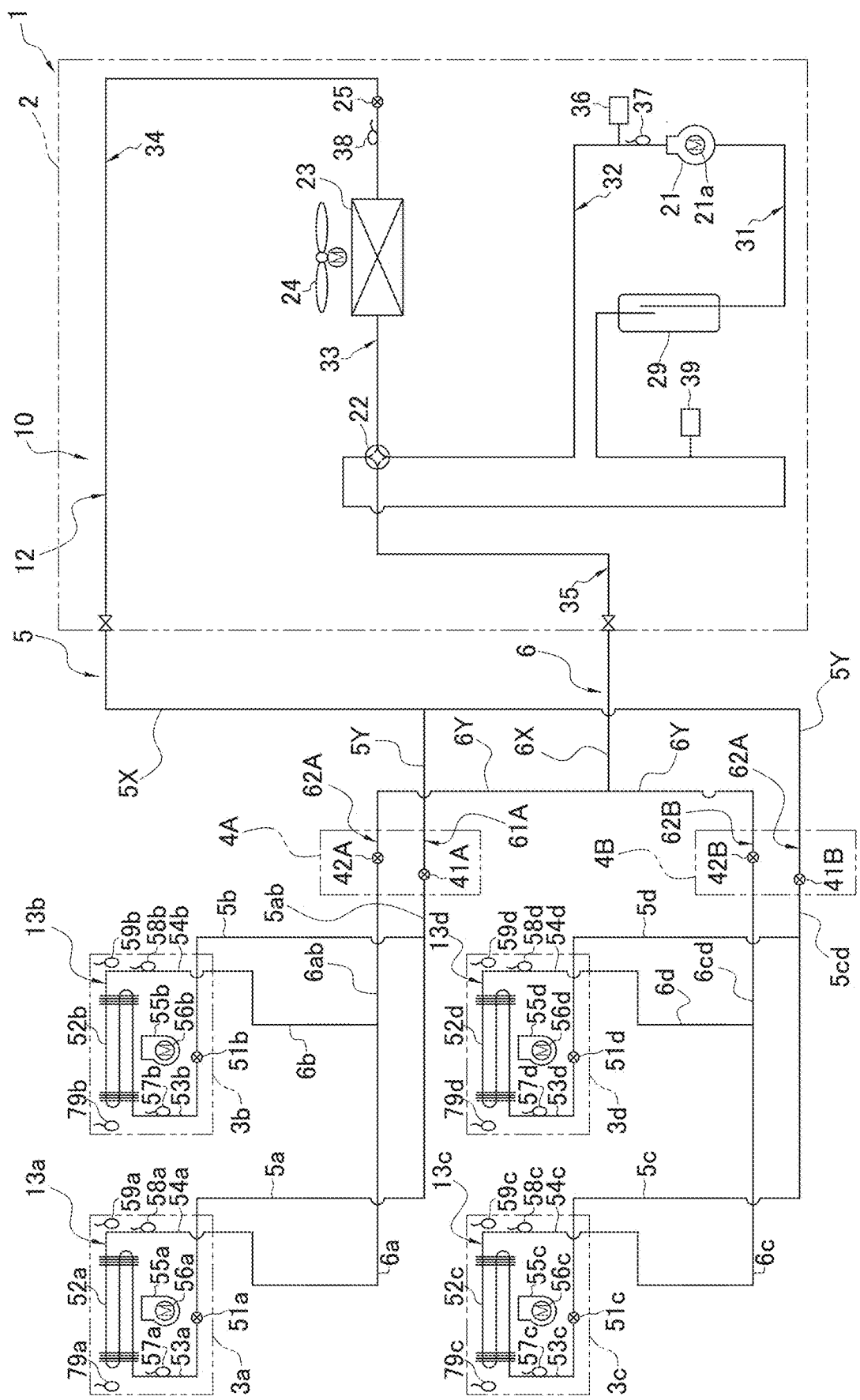
FIG. 1 is a schematic configuration diagram of an air conditioning apparatus that is an example of a refrigerant cycle apparatus according to one or more embodiments.

FIG. 1 illustrates a schematic configuration of an air conditioning apparatus 1 that is an example of a refrigerant cycle apparatus. The air conditioning apparatus 1 is configured to cool and heat the interiors of rooms in a building or the like by a vapor compression refrigeration cycle. The air conditioning apparatus 1 mainly includes a heat source-side unit 2, a plurality of utilization-side units 3a, 3b, 3c, and 3d, a relay units 4A, 4B connected to the utilization-side units 3a, 3b, 3c and 3d, refrigerant connection pipes 5 and 6, and a control unit 19 (see FIG. 2A). The plurality of utilization-side units 3a, 3b, 3c, and 3d are connected to the heat source-side unit 2 in parallel. The refrigerant connection pipes 5 and 6 connect the heat source-side unit 2 to the utilization-side units 3a, 3b, 3c, and 3d via the relay units 4A and 4B. The control unit 19 controls constituent elements of the heat source-side unit 2, utilization-side units 3a, 3b, 3c, and 3d, and relay units 4A and 4B. The air conditioning apparatus 1 includes a vapor compression refrigerant circuit 10. The refrigerant circuit 10 is configured by connecting a heat source-side refrigerant circuit 12 of the heat source-side unit 2, utilization-side refrigerant circuits 13a, 13b, 13c, and 13d of the utilization-side units 3a, 3b, 3c, and 3d, the relay units 4A and 4B, and the refrigerant connection pipes 5 and 6.

The refrigerant circuit 10 is filled with R32 as a refrigerant. Leakage of R32 from the refrigerant circuit 10 into rooms (spaces where the utilization-side units are installed) in high concentrations may cause a combustion accident due to the flammability of the refrigerant. It has been required to prevent this combustion accident.

In the air conditioning apparatus 1, the heat source-side unit 2 includes a switching mechanism 22 configured to switch between a cooling operation and a heating operation of each of the utilization-side units 3a, 3b, 3c, and 3d.

(1-1) Refrigerant Connection Pipes

The liquid-side refrigerant connection pipe 5 mainly includes a main pipe portion 5X extending from the heat source-side unit 2, a plurality of branched pipe portions 5Y branching off from the main pipe portion 5X before the relay units 4A and 4B, and downstream pipe portions connecting the relay units 4A and 4B and the utilization-side units 3a, 3b, 3c, and 3d.

The gas-side refrigerant connection pipe 6 mainly includes a main pipe portion 6X extending from the heat source-side unit 2, a plurality of branched pipe portions 6Y branching off from the main pipe portion 6X before the relay units 4A and 4B, and downstream pipe portions connecting the relay units 4A and 4B and the utilization-side units 3a, 3b, 3c, and 3d.

As illustrated in FIG. 1, the downstream pipe portions of the liquid-side refrigerant connection pipe 5 and the downstream pipe portions of the gas-side refrigerant connection pipe 6 include a first connection pipe group 5ab, 5a, 5b, 6ab, 6a, 6b connecting the relay unit 4A and the utilization-side units 3a and 3b. The first connection pipe group 5ab, 5a, 5b, 6ab, 6a, 6b includes common pipes 5ab, 6ab extending from the relay unit 4A to the utilization-side units 3a and 3b, most-downstream pipes 5a, 6a branching off from the common pipes 5ab, 6ab and extending to the utilization-side refrigerant circuit 13a of the utilization-side unit 3a, and most-downstream pipes 5b, 6b branching off from the common pipe 5ab, 6ab and extending to the utilization-side refrigerant circuit 13b of the utilization-side unit 3b.

The liquid refrigerant flowing through the liquid-side refrigerant connection pipe 5 is in a liquid phase or has a larger ratio of a liquid phase than that of a gas phase. The gas refrigerant flowing through the gas-side refrigerant connection pipe 6 is in a gas phase or has a larger ratio of a gas phase than that of a liquid phase.

(1-2) Utilization-Side Units

The utilization-side units 3a, 3b, 3c, and 3d are installed in rooms of a building or the like. As described above, the utilization-side refrigerant circuits 13a, 13b, 13c, and 13d of the utilization-side units 3a, 3b, 3c, and 3d are connected to the heat source-side unit 2 via the liquid-side refrigerant connection pipe 5, the gas-side refrigerant connection pipe 6, and the relay units 4A and 4B, and each serves as a part of the refrigerant circuit 10.

Next, a description will be given of a configuration of each of the utilization-side units 3a, 3b, 3c, and 3d. Since the utilization-side unit 3a is similar in configuration to the utilization-side units 3b, 3c, and 3d, a description will be given of only the configuration of the utilization-side unit 3a. The components of the utilization-side units 3b, 3c, and 3d are not described since the components can be understood in such a way that the alphabet "a" in the reference signs representing the respective components of the utilization-side unit 3a is replaced with the alphabets "b", "c", and "d".

The utilization-side unit 3a mainly includes a utilization-side expansion valve 51a and a utilization-side heat exchanger 52a. The utilization-side unit 3a also includes a utilization-side liquid refrigerant pipe 53a connecting a liquid-side end of the utilization-side heat exchanger 52a and the liquid-side refrigerant connection pipe 5 (here, the most-downstream pipe 5a), and a utilization-side gas refrigerant pipe 54a connecting a gas-side end of the utilization-side heat exchanger 52a and the gas-side refrigerant connection pipe 6 (here, the most-downstream pipe 6a).

The utilization-side expansion valve 51a is an electric expansion valve which is capable of adjusting a flow rate of the refrigerant flowing through the utilization-side heat exchanger 52a while decompressing the refrigerant. The utilization-side expansion valve 51a is disposed on the utilization-side liquid refrigerant pipe 53a.

The utilization-side heat exchanger 52a functions as a refrigerant evaporator to cool indoor air, or functions as a refrigerant radiator to heat the indoor air. The utilization-side unit 3a includes a utilization-side fan 55a. The utilization-side fan 55a provides, to the utilization-side heat exchanger 52a, the indoor air serving as a cooling source or a heating source for the refrigerant flowing through the utilization-side heat exchanger 52a. The utilization-side fan 55a is driven by a utilization-side fan motor 56a.

The utilization-side unit 3a includes various sensors. Specifically, the utilization-side unit 3a includes a utilization-side heat exchange liquid-side sensor 57a that detects a temperature of the refrigerant at the liquid-side end of the utilization-side heat exchanger 52a, a utilization-side heat exchange gas-side sensor 58a that detects a temperature of the refrigerant at the gas-side end of the utilization-side heat exchanger 52a, and an indoor air sensor 59a that detects a temperature of the indoor air sucked into the utilization-side unit 3a. The utilization-side unit 3a also includes a refrigerant leakage detection unit 79a that detects leakage of the refrigerant. Examples of the refrigerant leakage detection unit 79a may include, but not limited to, a semiconductor gas sensor and a detection unit configured to detect a rapid refrigerant pressure drop in the utilization-side unit 3a. In a case where the refrigerant leakage detection unit 79a is a semiconductor gas sensor, the refrigerant leakage detection unit 79a is connected to a utilization-side control unit 93a (see FIG. 2A). In a case where the refrigerant leakage detection unit 79a is a detection unit configured to detect a rapid refrigerant pressure drop, a pressure sensor is disposed on a refrigerant pipe, and the utilization-side control unit 93a is equipped with a detection algorithm for determining leakage of the refrigerant from a change of the sensor value.

In one or more embodiments, the utilization-side unit 3a includes the refrigerant leakage detection unit 79a. The refrigerant leakage detection unit 79a may alternatively be incorporated in a remote controller for operating the utilization-side unit 3a or installed in, for example, an indoor space to be subjected to air conditioning by the utilization-side unit 3a.

(1-3) Heat Source-Side Unit

The heat source-side unit 2 is installed outdoors, for example, on the rooftop of a building or on the ground. As described above, the heat source-side refrigerant circuit 12 of the heat source-side unit 2 is connected to the utilization-side units 3a, 3b, 3c, and 3d via the liquid-side refrigerant connection pipe 5, the gas-side refrigerant connection pipe 6, and the relay units 4A and 4B, and serves as a part of the refrigerant circuit 10.

The heat source-side unit 2 mainly includes a compressor 21 and a heat source-side heat exchanger 23. The heat source-side unit 2 also includes the switching mechanism 22 as a mechanism configured to switch between the cooling operation and the heating operation. The switching mechanism 22 switches between a cooling operation state in which the heat source-side heat exchanger 23 functions as a refrigerant radiator and each of the utilization-side heat exchangers 52a, 52b, 52c, and 52d functions as a refrigerant evaporator and a heating operation state in which the heat source-side heat exchanger 23 functions as a refrigerant evaporator and each of the utilization-side heat exchangers 52a, 52b, 52c, and 52d functions as a refrigerant radiator. A suction refrigerant pipe 31 connects the switching mechanism 22 and a suction side of the compressor 21. An accumulator 29 is disposed on the suction refrigerant pipe 31. The accumulator 29 temporarily stores the refrigerant to be sucked into the compressor 21. A discharge refrigerant pipe 32 connects a discharge side of the compressor 21 and the switching mechanism 22. A first heat source-side gas refrigerant pipe 33 connects the switching mechanism 22 and a gas-side end of the heat source-side heat exchanger 23. A heat source-side liquid refrigerant pipe 34 connects a liquid-side end of the heat source-side heat exchanger 23 and the liquid-side refrigerant connection pipe 5. A second heat source-side gas refrigerant pipe 35 connects the switching mechanism 22 and the gas-side refrigerant connection pipe 6.

The compressor 21 is configured to compress the refrigerant. The compressor 21 to be used herein is, for example, a closed compressor in which a displacement, such as rotary or scroll, compression element (not illustrated) is driven to rotate by a compressor motor 21a.

The switching mechanism 22 is, for example, a four-way switching valve capable of switching a flow of the refrigerant in the refrigerant circuit 10. In the case where the heat source-side heat exchanger 23 functions as a refrigerant radiator and each of the utilization-side heat exchangers 52a, 52b, 52c, and 52d functions as a refrigerant evaporator (hereinafter, this case will be referred to as the "cooling operation state"), the switching mechanism 22 connects the discharge side of the compressor 21 to the gas side of the heat source-side heat exchanger 23 (see a solid line on the switching mechanism 22 illustrated in FIG. 1). In the case where the heat source-side heat exchanger 23 functions as a refrigerant evaporator and each of the utilization-side heat exchangers 52a, 52b, 52c, and 52d functions as a refrigerant radiator (hereinafter, this case will be referred to as the "heating operation state"), the switching mechanism 22 connects the suction side of the compressor 21 to the gas side of the heat source-side heat exchanger 23 (see a broken line on the first switching mechanism 22 illustrated in FIG. 1).

The heat source-side heat exchanger 23 functions as a refrigerant radiator or a refrigerant evaporator. The heat source-side unit 2 includes a heat source-side fan 24. The heat source-side fan 24 provides outdoor air to the heat source-side unit 2. The heat source-side unit 2 sucks therein the outdoor air, and the heat source-side heat exchanger 23 causes the outdoor air to exchange heat with the refrigerant. The outdoor air is then discharged from the heat source-side unit 2. The heat source-side fan 24 is driven by a heat source-side fan motor.

In the cooling operation of the air conditioning apparatus 1, the refrigerant flows from the heat source-side heat exchanger 23 to the utilization-side heat exchangers 52a, 52b, 52c, and 52d each functioning as a refrigerant evaporator, through the liquid-side refrigerant connection pipe 5 and the relay units 4A and 4B. In the heating operation of the air conditioning apparatus 1, the refrigerant flows from the compressor 21 to the utilization-side heat exchangers 52a, 52b, 52c, and 52d each functioning as a refrigerant radiator, through the gas-side refrigerant connection pipe 6 and the relay units 4A and 4B. In the cooling operation, the switching mechanism 22 switches to the cooling operation state. The heat source-side heat exchanger 23 functions as a refrigerant radiator. The refrigerant flows from the heat source-side unit 2 to the utilization-side units 3a, 3b, 3c, and 3d through the liquid-side refrigerant connection pipe 5 and the relay units 4A and 4B. In the heating operation, the switching mechanism 22 switches to the heating operation state. The refrigerant flows from the utilization-side units 3a, 3b, 3c, and 3d to the heat source-side unit 2 through the liquid-side refrigerant connection pipe 5 and the relay units 4A and 4B. The heat source-side heat exchanger 23 functions as a refrigerant evaporator.

A heat source-side expansion valve 25 is disposed on the heat source-side liquid refrigerant pipe 34. The heat source-side expansion valve 25 is electrically driven to decompress the refrigerant in the heating operation. The heat source-side expansion valve 25 is disposed near the liquid-side end of the heat source-side heat exchanger 23 on the heat source-side liquid refrigerant pipe 34.

The heat source-side unit 2 includes various sensors. Specifically, the heat source-side unit 2 includes a discharge pressure sensor 36 that detects a pressure (a discharge pressure) of the refrigerant discharged from the compressor 21, a discharge temperature sensor 37 that detects a temperature (a discharge temperature) of the refrigerant discharged from the compressor 21, and a suction pressure sensor 39 that detects a pressure (a suction pressure) of the refrigerant sucked into the compressor 21. The heat source-side unit 2 also includes a heat source-side heat exchange liquid-side sensor 38 that detects a temperature (a heat source-side heat exchange outlet temperature) of the refrigerant at the liquid-side end of the heat source-side heat exchanger 23.

(1-4) Relay Units

The relay units 4A and 4B are installed indoors, for example, in attic spaces of rooms and passageways in a building. The relay units 4A and 4B are interposed together with the liquid-side refrigerant connection pipe 5 and the gas-side refrigerant connection pipe 6 between the utilization-side units 3a, 3b, 3c, and 3d and the heat source-side unit 2, and each serves as a part of the refrigerant circuit 10. The relay units 4A and 4B function as refrigerant shut-off units that block the flows of the refrigerant between the utilization-side units 3a, 3b, 3c, and 3d and the heat source-side unit 2. The relay units 4A, 4B may be disposed near the utilization-side units 3a, 3b, 3c, 3d. Alternatively, the relay units 4A, 4B may be disposed away from the utilization-side units 3a, 3b, 3c, 3d. Still alternatively, the relay units 4A and 4B may be collectively disposed at one place.

Next, a description will be given of a configuration of each of the relay units 4A and 4B. Since the relay unit 4A is similar in configuration to the relay unit 4B, a description will be given of only the configuration of the relay unit 4A. The components of the relay unit 4B are not described since the components can be understood in such a way that the alphabet "A" in the reference signs representing the respective components of the relay unit 4A is replaced with the alphabet "B".

The relay unit 4A mainly includes a liquid connection pipe 61A and a gas connection pipe 62A.

The liquid connection pipe 61A has a first end connected to one of the branched pipe portions 5Y of the liquid-side refrigerant connection pipe 5 and a second end connected to the common pipe 5ab of the liquid-side refrigerant connection pipe 5. A liquid relay shut-off valve 41A is disposed on the liquid connection pipe 61A. The liquid relay shut-off valve 41A is an electric expansion valve.

The gas connection pipe 62A has a first end connected to one of the branched pipe portions 6Y of the gas-side refrigerant connection pipe 6 and a second end connected to the common pipe 6ab of the gas-side refrigerant connection pipe 6. A gas relay shut-off valve 42A is disposed on the gas connection pipe 62A. The gas relay shut-off valve 42A is an electric expansion valve.

In the cooling operation and the heating operation, each of the liquid relay shut-off valve 41A and the gas relay shut-off valve 42A is in a fully open state.

(1-5) Control Unit

Figure 2A:
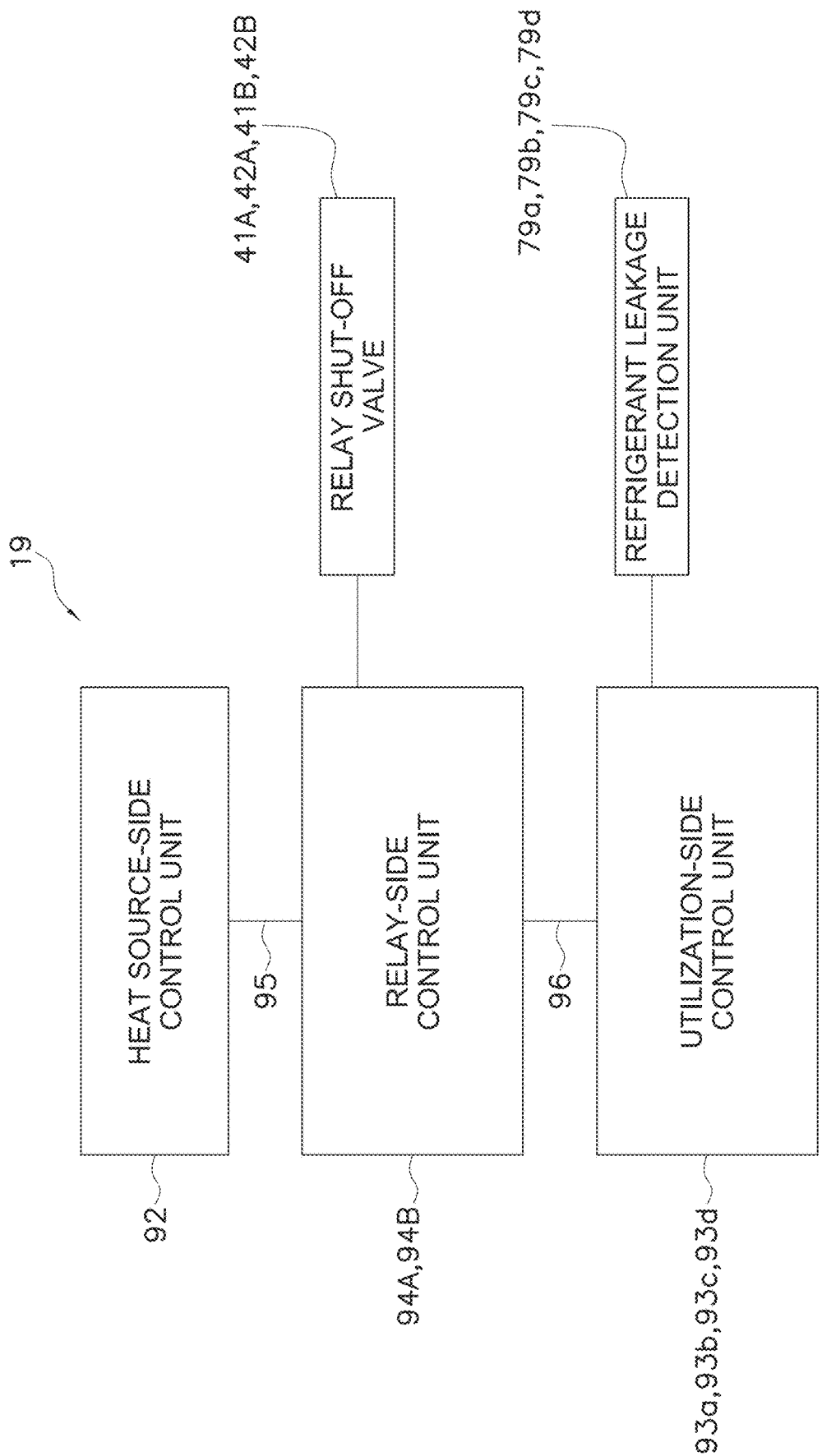
FIG. 2A is a functional block diagram of the air conditioning apparatus.

As illustrated in FIG. 2A, the control unit 19 includes a heat source-side control unit 92, relay-side control units 94A and 94B connected to the heat source-side control unit 92 via a transmission line 95, and utilization-side control units 93a, 93b, 93c, and 93d connected to the relay-side control units 94A and 94B via a transmission line 96. The heat source-side control unit 92 controls the constituent components of the heat source-side unit 2. The relay-side control unit 94A controls the constituent components of the relay unit 4A, and the relay-side control unit 94B controls the constituent components of the relay unit 4B. The utilization-side control unit 93a controls the constituent components of the utilization-side unit 3a, the utilization-side control unit 93b controls the constituent components of the utilization-side unit 3b, the utilization-side control unit 93c controls the constituent components of the utilization-side unit 3c, and the utilization-side control unit 93d controls the constituent components of the utilization-side unit 3d. The heat source-side control unit 92 of the heat source-side unit 2, the relay-side control units 94A and 94B of the relay units 4A and 4B, and the utilization-side control units 93a, 93b, 93c, and 93d of the utilization-side units 3a, 3b, 3c, and 3d exchange information such as control signals with one another via the transmission lines 95 and 96.

The heat source-side control unit 92 includes a control board having electric components such as a microcomputer and a memory mounted thereon. The heat source-side control unit 92 is connected to the various constituent components 21, 22, 24, and 25 and various sensors 36, 37, 38, and 39 of the heat source-side unit 2. Each of the relay-side control units 94A and 94B includes a control board having electric components such as a microcomputer and a memory mounted thereon. The relay-side control unit 94A is connected to the gas relay shut-off valve 42A and liquid relay shut-off valve 41A of the relay unit 4A. The relay-side control unit 94B is connected to the gas relay shut-off valve 42B and liquid relay shut-off valve 41B of the relay unit 4B. The relay-side control units 94A and 94B are connected to the heat source-side control unit 92 via the first transmission line 95. Each of the utilization-side control units 93a, 93b, 93c, and 93d includes a control board having electric components such as a microcomputer and a memory mounted thereon. The utilization-side control unit 93a is connected to the various constituent components 51a and 55a and various sensors 57a, 58a, 59a, and 79a of the utilization-side unit 3a. The utilization-side control unit 93b is connected to the various constituent components 51b and 55b and various sensors 57b, 58b, 59b, and 79b of the utilization-side unit 3b. The utilization-side control unit 93c is connected to the various constituent components 51c and 55c and various sensors 57c, 58c, 59c, and 79c of the utilization-side unit 3c. The utilization-side control unit 93d is connected to the various constituent components 51d and 55d and various sensors 57d, 58d, 59d, and 79d of the utilization-side unit 3d. The utilization-side control units 93a, 93b, 93c, and 93d are connected to the relay-side control units 94A and 94B via the second transmission line 96.

In this way, the control unit 19 controls the operation of the entire air conditioning apparatus 1. Specifically, the control unit 19 controls the various constituent components 21, 22, 24, 25, 51a to 51d, 55a to 55d, 41A, 41B, 42A, and 42B of the air conditioning apparatus 1 (here, the heat source-side unit 2, utilization-side units 3a, 3b, 3c, and 3d, and relay units 4A and 4B), based on, for example, detection signals from the various sensors 36, 37, 38, 39, 57a to 57d, 58a to 58d, 59a to 59d, and 79a to 79d.

(2) Basic Operation of Air Conditioning Apparatus

Next, a description will be given of a basic operation of the air conditioning apparatus 1. The basic operation of the air conditioning apparatus 1 includes the cooling operation and the heating operation as described above. The basic operation of the air conditioning apparatus 1 to be described below is performed by the control unit 19 that controls the constituent components of the air conditioning apparatus 1 (the heat source-side unit 2, utilization-side units 3a, 3b, 3c, and 3d, and relay units 4A and 4B).

(2-1) Cooling Operation

In the cooling operation, for example, in a case where all the utilization-side units 3a, 3b, 3c, and 3d perform the cooling operation (in which all the utilization-side heat exchangers 52a, 52b, 52c, and 52d function as a refrigerant evaporator, and the heat source-side heat exchanger 23 functions as a refrigerant radiator), the switching mechanism 22 switches to the cooling operation state (the state indicated by the solid line on the switching mechanism 22 illustrated in FIG. 1), so that the compressor 21, the heat source-side fan 24, and the utilization-side fans 55a, 55b, 55c, and 55d are driven. In addition, the liquid relay shut-off valve 41A and gas relay shut-off valve 42A of the relay unit 4A are fully opened, and the liquid relay shut-off valve 41B and gas relay shut-off valve 42B of the relay unit 4B are fully opened.

In the cooling operation, the high-pressure refrigerant discharged from the compressor 21 flows into the heat source-side heat exchanger 23 through the switching mechanism 22. When the refrigerant flows into the heat source-side heat exchanger 23, the heat source-side heat exchanger 23 functioning as a refrigerant radiator cools the refrigerant by heat exchange with the outdoor air provided by the heat source-side fan 24 to condense the refrigerant. The refrigerant flows out of the heat source-side unit 2 through the heat source-side expansion valve 25.

When the refrigerant flows out of the heat source-side unit 2, the refrigerant then flows into the relay units 4A and 4B in a branched manner through the liquid-side refrigerant connection pipe 5 (the main pipe portion 5X and branched pipe portions 5Y). When the refrigerant flows into the relay units 4A and 4B, the refrigerant then flows out of the relay units 4A and 4B through the liquid relay shut-off valves 41A and 41B.

When the refrigerant flows out of the relay units 4A and 4B, the refrigerant then flows into the utilization-side units 3a, 3b, 3c, and 3d through the common pipes 5ab and 5cd and the most-downstream pipes 5a, 5b, 5c, and 5d. When the refrigerant flows into the utilization-side units 3a, 3b, 3c, and 3d, each of the utilization-side expansion valves 51a, 51b, 51c, and 51d decompresses the refrigerant. The refrigerant then flows into the utilization-side heat exchangers 52a, 52b, 52c, and 52d. When the refrigerant flows into the utilization-side heat exchangers 52a, 52b, 52c, and 52d, the utilization-side heat exchangers 52a, 52b, 52c, and 52d each functioning as a refrigerant evaporator heat the refrigerant by heat exchange with indoor air supplied from the rooms by the utilization-side fans 55a, 55b, 55c, and 55d to evaporate the refrigerant. The refrigerant thus evaporated flows out of the utilization-side units 3a, 3b, 3c, and 3d. On the other hand, the indoor air cooled in the utilization-side heat exchangers 52a, 52b, 52c, and 52d is supplied to the rooms to cool the interiors of the rooms.

When the refrigerant flows out of the utilization-side units 3a, 3b, 3c, and 3d, the refrigerant then flows into the relay units 4A and 4B through the most-downstream pipes 6a, 6b, 6c, and 6d and common pipes 6ab and 6cd of the gas-side refrigerant connection pipe 6. When the refrigerant flows into the relay units 4A and 4B, the refrigerant then flows out of the relay units 4A and 4B through the gas relay shut-off valves 42A and 42B.

When the refrigerant flows out of the relay units 4A and 4B, the refrigerant then flows into the heat source-side unit 2 in a merged state through the gas-side refrigerant connection pipe 6 (the main pipe portion 6X and branched pipe portions 6Y). When the refrigerant flows into the heat source-side unit 2, the refrigerant is then sucked into the compressor 21 via the switching mechanism 22 and the accumulator 29.

(2-2) Heating Operation

In the heating operation, for example, in a case where all the utilization-side units 3a, 3b, 3c, and 3d perform the heating operation, the switching mechanism 22 switches to the heating operation state (the state indicated by the broken line on the switching mechanism 22 illustrated in FIG. 1), so that the compressor 21, the heat source-side fan 24, and the utilization-side fans 55a, 55b, 55c, and 55d are driven. In addition, the liquid relay shut-off valve 41A and gas relay shut-off valve 42A of the relay unit 4A are fully opened, and the liquid relay shut-off valve 41B and gas relay shut-off valve 42B of the relay unit 4B are fully opened.

The high-pressure refrigerant discharged from the compressor 21 flows out of the heat source-side unit 2 through the switching mechanism 22.

When the refrigerant flows out of the heat source-side unit 2, the refrigerant then flows into the relay units 4A and 4B through the gas-side refrigerant connection pipe 6 (the main pipe portion 6X and branched pipe portions 6Y). When the refrigerant flows into the relay units 4A and 4B, the refrigerant then flows out of the relay units 4A and 4B through the gas relay shut-off valves 42A and 42B.

When the refrigerant flows out of the relay units 4A and 4B, the refrigerant then flows into the utilization-side units 3a, 3b, 3c, and 3d through the common pipes 6ab and 6cd and the most-downstream pipes 6a, 6b, 6c, and 6d. When the refrigerant flows into the utilization-side units 3a, 3b, 3c, and 3d, the refrigerant then flows into the utilization-side heat exchangers 52a, 52b, 52c, and 52d. When the high-pressure refrigerant flows into the utilization-side heat exchangers 52a, 52b, 52c, and 52d, the utilization-side heat exchangers 52a, 52b, 52c, and 52d each functioning as a refrigerant radiator cool the refrigerant by heat exchange with indoor air supplied from the rooms by the utilization-side fans 55a, 55b, 55c, and 55d, to condense the refrigerant. Each of the utilization-side expansion valves 51a, 51b, 51c, and 51d decompresses the refrigerant thus condensed. The refrigerant then flows out of the utilization-side units 3a, 3b, 3c, and 3d. On the other hand, the indoor air heated in the utilization-side heat exchangers 52a, 52b, 52c, and 52d is supplied to the rooms to heat the interiors of the rooms.

When the refrigerant flows out of the utilization-side units 3a, 3b, 3c, and 3d, the refrigerant then flows into the relay units 4A and 4B through the most-downstream pipes 5a, 5b, 5c, and 5d and the common pipes 5ab and 5cd. When the refrigerant flows into the relay units 4A and 4B, the refrigerant then flows out of the relay units 4A and 4B through the liquid relay shut-off valves 41A and 41B.

When the refrigerant flows out of the relay units 4A and 4B, the refrigerant then flows into the heat source-side unit 2 in a merged state through the liquid-side refrigerant connection pipe 5 (the main pipe portion 5X and branched pipe portions 5Y). When the refrigerant flows into the heat source-side unit 2, the refrigerant then flows into the heat source-side expansion valve 25. When the refrigerant flows into the heat source-side expansion valve 25, the heat source-side expansion valve 25 decompresses the refrigerant. The refrigerant thus decompressed then flows into the heat source-side heat exchanger 23. When the refrigerant flows into the heat source-side heat exchanger 23, the heat source-side heat exchanger 23 heats the refrigerant by heat exchange with outdoor air provided by the heat source-side fan 24 to evaporate the refrigerant. The refrigerant thus evaporated is sucked into the compressor 21 via the switching mechanism 22 and the accumulator 29.

(3) Operation of Air Conditioning Apparatus Upon Leakage of Refrigerant

Figure 2B:
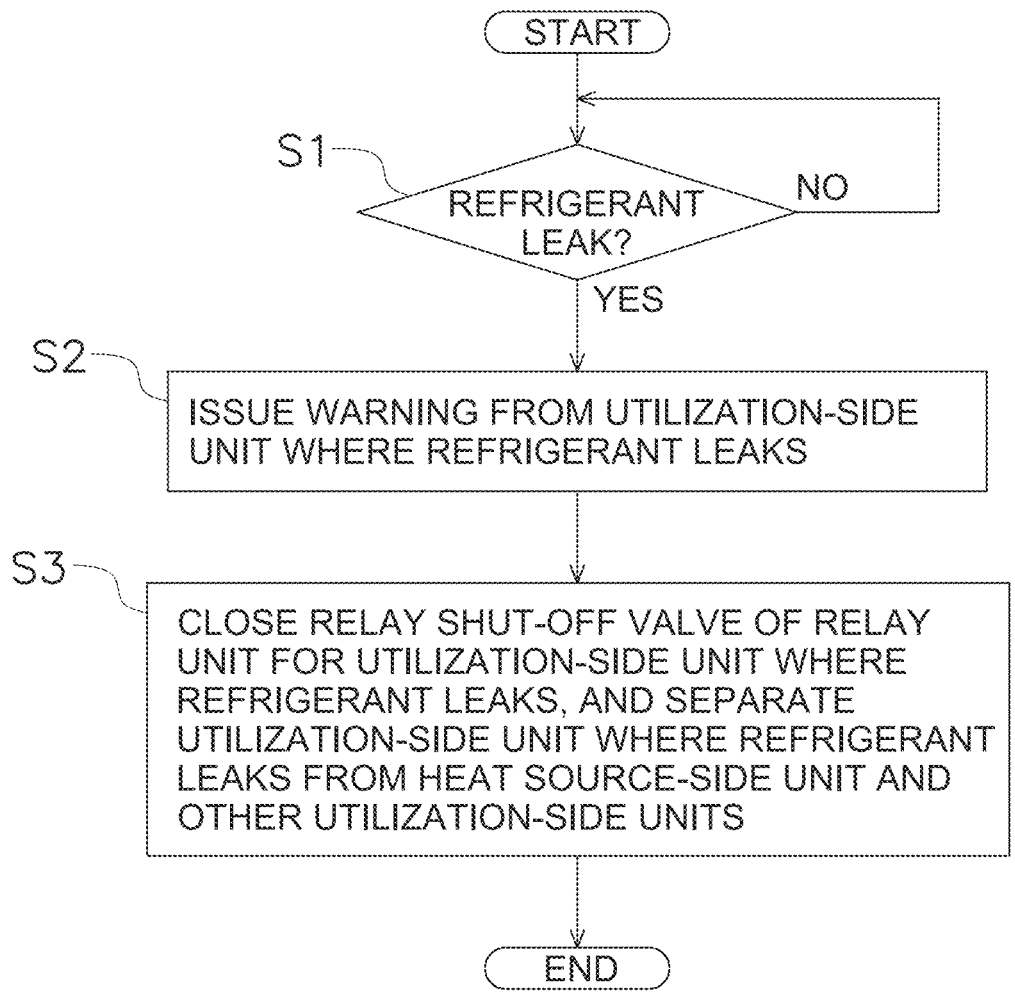
FIG. 2B is a flowchart of control upon leakage of a refrigerant.

With reference to FIG. 2B, next, a description will be given of an operation of the air conditioning apparatus 1 upon leakage of the refrigerant. As will be described below, the control unit 19 that controls the constituent components of the air conditioning apparatus 1 performs the operation of the air conditioning apparatus 1 upon leakage of the refrigerant, in a manner similar to that for the foregoing basic operation.

Since the control unit 19 performs the similar control even when the leakage of the refrigerant occurs at any of the utilization-side units 3a, 3b, 3c, and 3d, a description will be given of a case where, for example, the leakage of the refrigerant occurs at the room where the utilization-side unit 3a is installed.

As illustrated in FIG. 2B, in step S1, the control unit 19 determines whether any one of the refrigerant leakage detection units 79a, 79b, 79c, and 79d of the utilization-side units 3a, 3b, 3c, and 3d detects leakage of the refrigerant. When the refrigerant leakage detection unit 79a of the utilization-side unit 3a detects the leakage of the refrigerant into the space (i.e., the interior of the room) where the utilization-side unit 3a is installed, the processing proceeds to step S2.

In step S2, next, the utilization-side unit 3a causing the leakage of the refrigerant issues a warning to a person in the space where the utilization-side unit 3a is installed, using an alarm (not illustrated) configured to sound a buzzer and to turn a light on.

In step S3, next, the control unit 19 closes the liquid relay shut-off valve 41A and gas relay shut-off valve 42A of the relay unit 4A for the utilization-side unit 3a causing the leakage of the refrigerant. The control unit 19 thus separates the upstream side and downstream side (where the utilization-side units 3a and 3b are provided) of the relay unit 4A from each other to stop the flow of the refrigerant via the relay unit 4A. The refrigerant thus never flows from the heat source-side unit 2 or the other utilization-side units 3c and 3d to the utilization-side units 3a and 3b.

(4) Arrangement of Relay Unit Functioning as Refrigerant Shut-Off Unit (4-1) Importance of Arrangement of Relay Unit As described above, if the refrigerant leaks from, for example, the utilization-side refrigerant circuit 13a of the utilization-side unit 3a, the control unit 19 closes the liquid relay shut-off valve 41A and gas relay shut-off valve 42A of the relevant relay unit 4A. The amount of the refrigerant that leaks into the space where the utilization-side unit 3a is installed therefore takes a maximum value equal to a total value of the amounts of the refrigerant in the utilization-side refrigerant circuit 13a of the utilization-side unit 3a, the utilization-side refrigerant circuit 13b of the utilization-side unit 3b, the common pipes 5ab and 6ab, and the most-downstream pipes 5a, 6a, 5b, and 6b on the downstream side of the relay unit 4A. As described in the foregoing item (1-1), a part of the liquid-side refrigerant connection pipe 5 and a part of the gas-side refrigerant connection pipe 6 located closer to the utilization-side units 3a and 3b than to the relay unit 4A are called the first connection pipe group (5ab, 5a, 5b, 6ab, 6a, 6b).

In other words, a sum of the amount of the refrigerant in the first connection pipe group (5ab, 5a, 5b, 6ab, 6a, 6b) and the amount of the refrigerant in the utilization-side refrigerant circuits 13a and 13b of the utilization-side units 3a and 3b corresponds to a maximum value of the amount of the refrigerant that leaks into the space where the utilization-side unit 3a causing the leakage of the refrigerant is installed. The maximum refrigerant leak amount is referred to as a refrigerant amount Q.

Figure 3A:
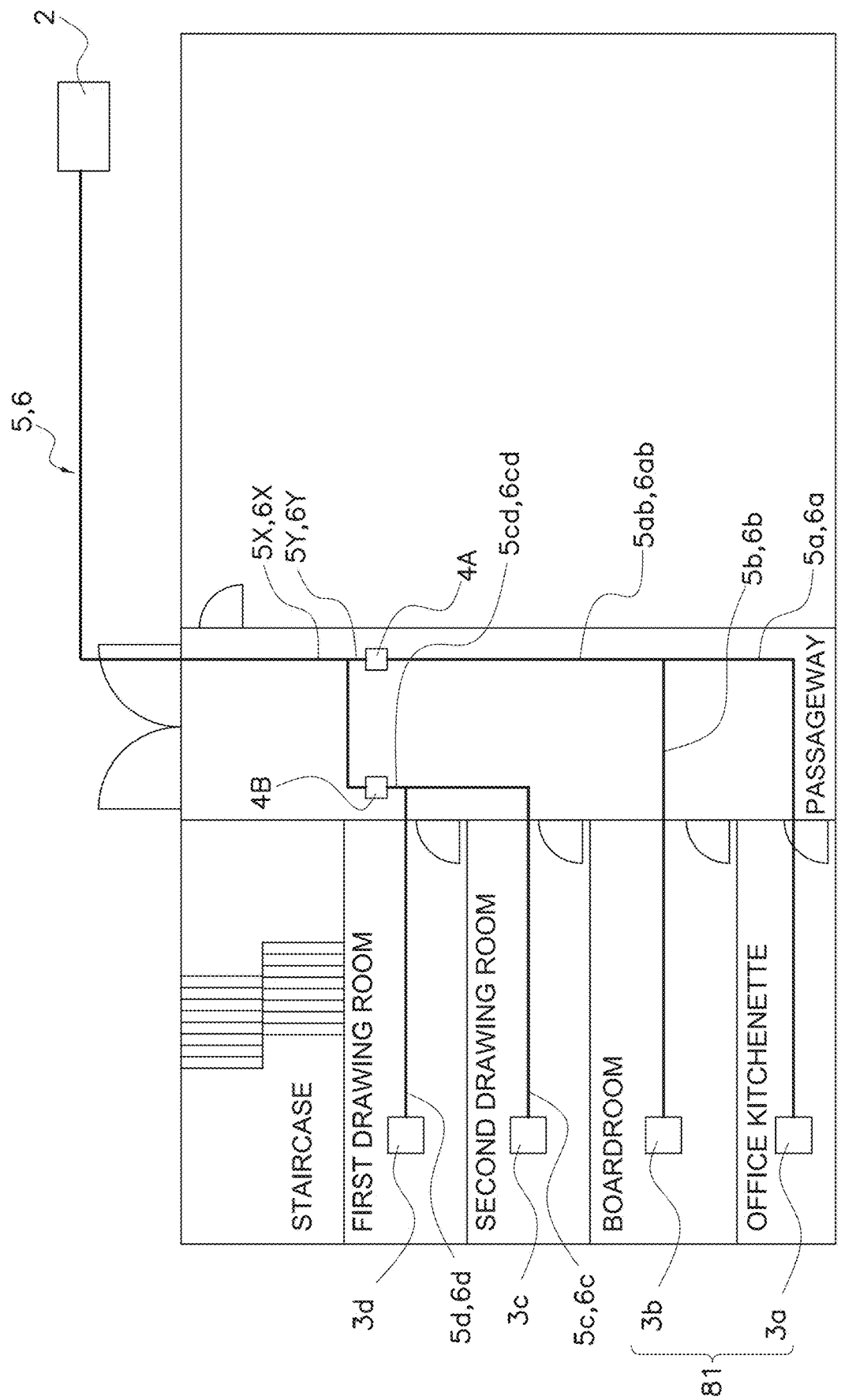
FIG. 3A is a diagram of exemplary arrangement A of a heat source-side unit, utilization-side units, and relay units.

As illustrated in FIG. 3A, it is assumed herein that the utilization-side unit 3a is installed on the ceiling of a small office kitchenette, the utilization-side unit 3b is installed on the ceiling of a large boardroom, the utilization-side unit 3c is installed on the ceiling of a first drawing room of a medium size, and the utilization-side unit 3d is installed on the ceiling of a second drawing room of a medium size. The heat source-side unit 2 is installed at a place slightly away from the four rooms. It is also assumed herein that there is an on-the-job demand to install the relay units 4A and 4B on the attic of a passageway adjacent to the four rooms and arrange the relay units 4A and 4B side by side as illustrated in FIG. 3A in consideration of maintainability.

However, in a case where the utilization-side units 3a and 3b each have a large capacity and a total pipe length of the first connection pipe group (5ab, 5a, 5b, 6ab, 6a, 6b) takes a large value, if the refrigerant leaks into the small office kitchenette, where the utilization-side unit 3a is installed, by the refrigerant amount Q, the concentration of the refrigerant R32 in the vicinity of a floor surface of the office kitchenette may increase to exceed a lower flammability limit (LFL)/safety factor (e.g., a safety factor of 4), depending on a spatial volume of the office kitchenette. The LFL refers to a minimum concentration of a refrigerant that enables propagation of flames with the refrigerant and air mixed evenly, in conformance with ISO817.

Figure 3B:
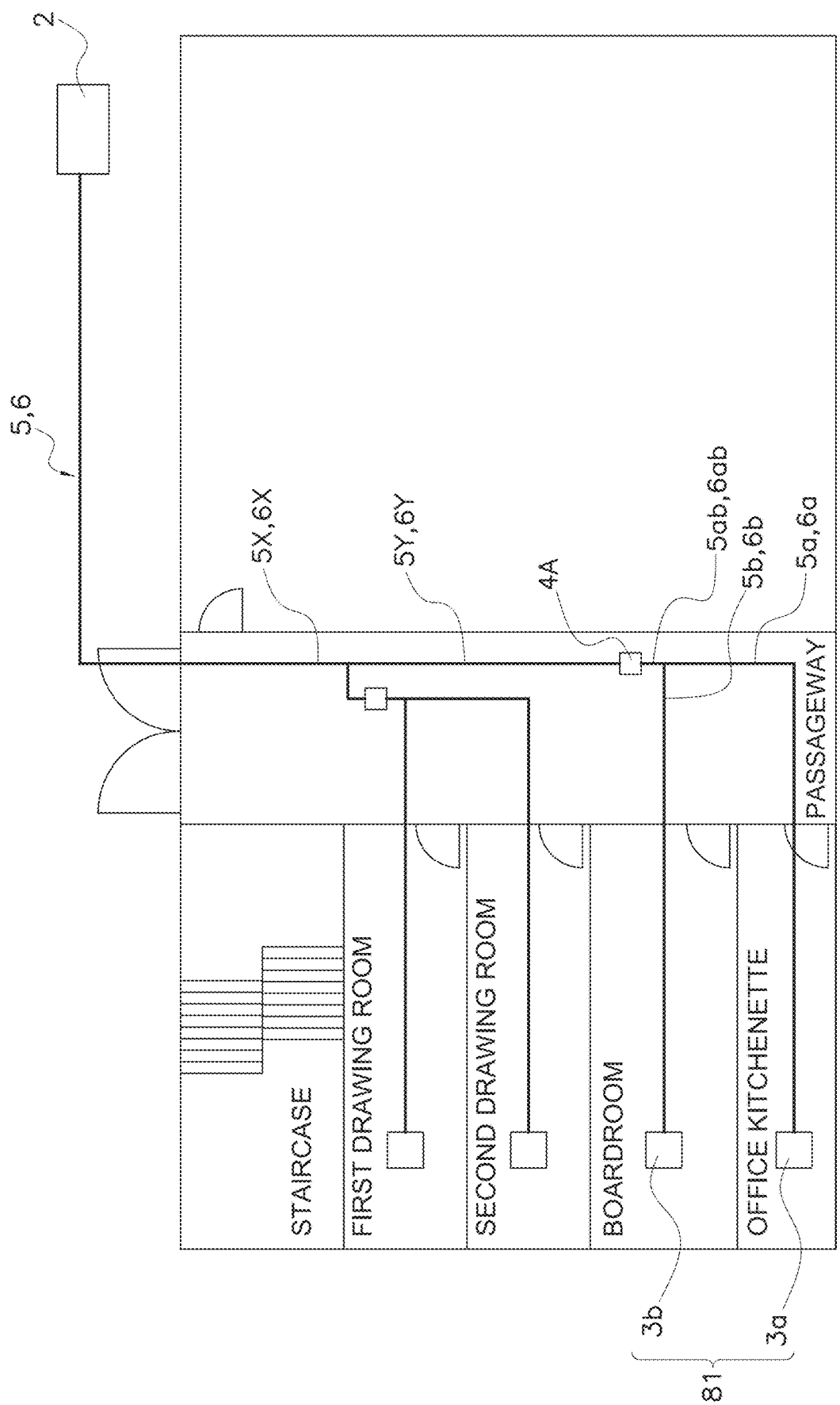
FIG. 3B is a diagram of exemplary arrangement B of the heat source-side unit, the utilization-side units, and the relay units.
Figure 3C:
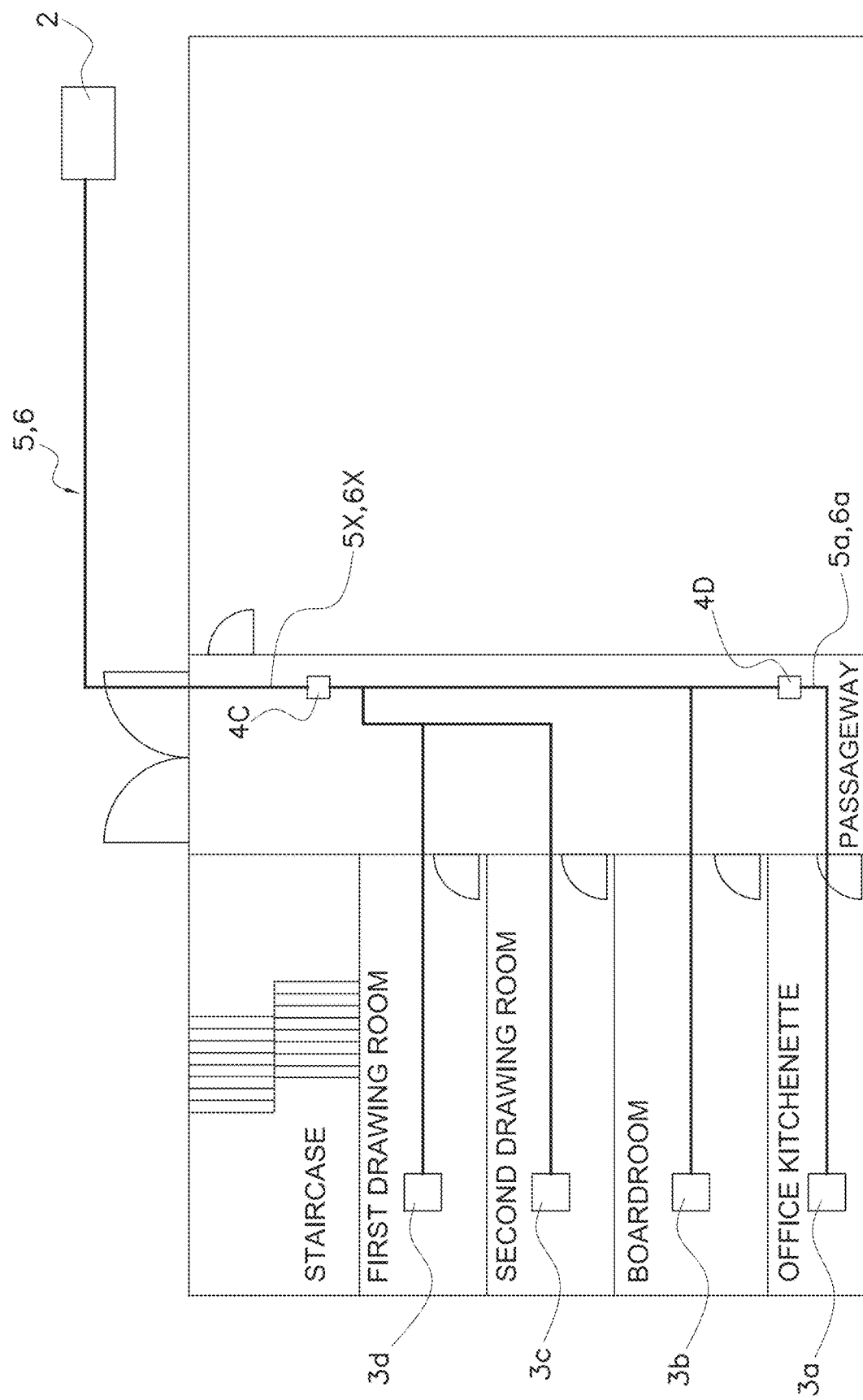
FIG. 3C is a diagram of exemplary arrangement C of the heat source-side unit, the utilization-side units, and relay units.
Figure 3D:
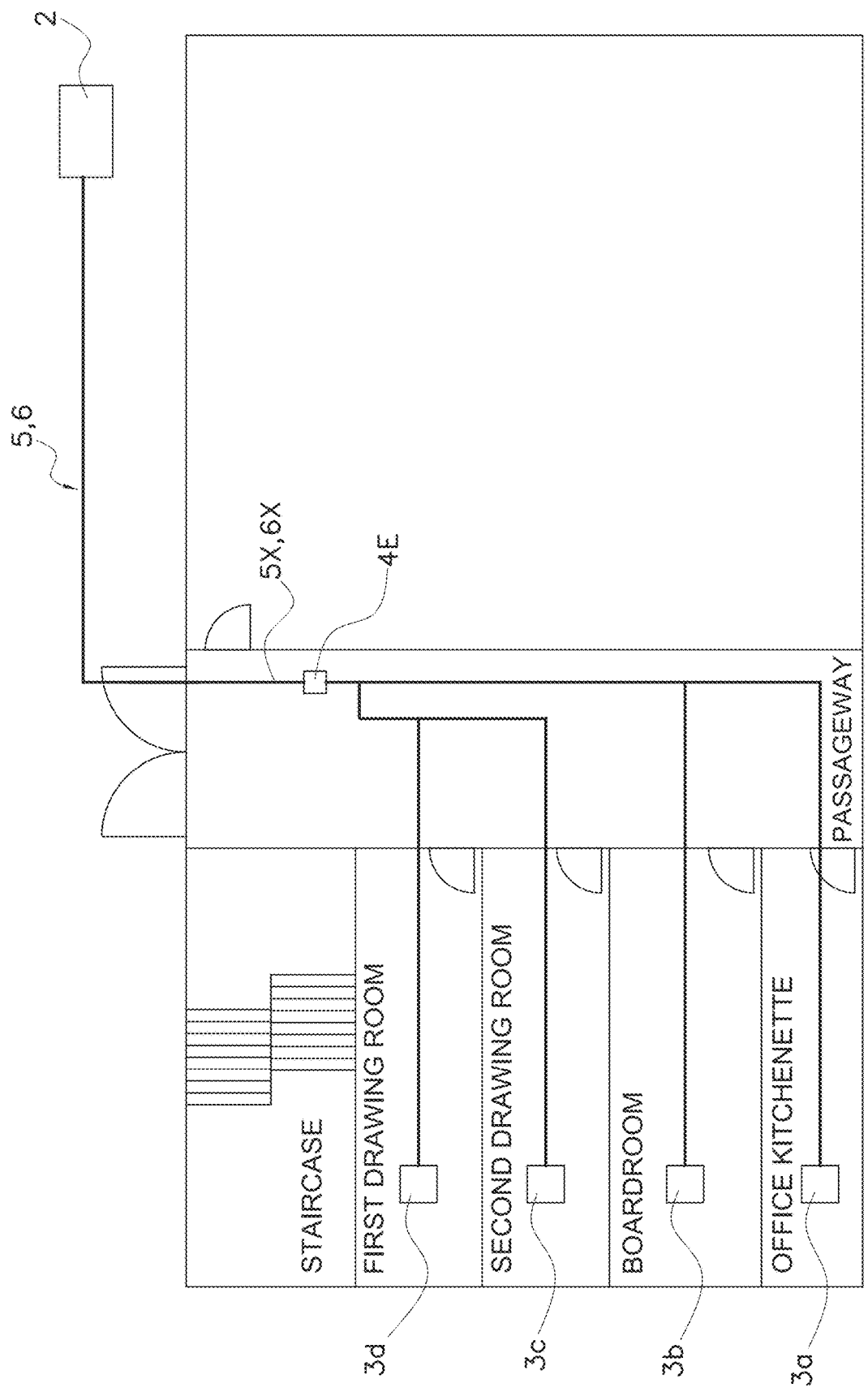
FIG. 3D is a diagram of exemplary arrangement D of the heat source-side unit, the utilization-side units, and a relay unit.

Therefore, if the concentration of the refrigerant that leaks into the small office kitchenette by the refrigerant amount Q exceeds the LFL/safety factor, it may be necessary to change the arrangement of the relay unit 4A as illustrated in FIG. 3B in order to reduce the refrigerant amount Q. If the concentration still exceeds the LFL/safety factor even after the change in arrangement of the relay unit 4A to the arrangement illustrated in FIG. 3B, it may be conceivable to deploy one relay unit 4D for the utilization-side unit 3a and to deploy one relay unit 4C for the remaining utilization-side units 3b, 3c, and 3d as illustrated in FIG. 3C. In contrast, it is assumed herein that the utilization-side units 3a, 3b, 3c, and 3d are installed in large rooms. In a case where all the refrigerant in the utilization-side units 3a, 3b, 3c, and 3d, the refrigerant in the first connection pipe group (5ab, 5a, 5b, 6ab, 6a, 6b), and the refrigerant in a second connection pipe group connecting the relay unit 4B and the utilization-side units 3c and 3d leak into one room (a room having the smallest spatial volume among the four rooms), if the concentration of the refrigerant in this room falls below the LFL/safety factor, it may be possible to achieve cost saving by installing one relay unit 4E functioning as a refrigerant shut-off unit as illustrated in FIGS. 3D and 3E. As described above, the arrangement of the relay unit is very important.

It should be noted that the relay units 4C, 4D, and 4E illustrated in FIGS. 3C to 3E are similar in configuration to the relay unit 4A described above.

(4-2) Air Conditioning Apparatus Designing Method Involving Fixing Arrangement of Relay Unit As described above, particularly in the case of deploying one common relay unit for a plurality of utilization-side units, how to fix arrangement of the relay unit functioning as a refrigerant shut-off unit is very important from the viewpoint of safety and cost. Heretofore, however, an experienced designer who is familiar with various refrigerant characteristics and laws and regulations has spent a lot of time to calculate and fix arrangement of a refrigerant shut-off unit every time for each case.

Figure 4:
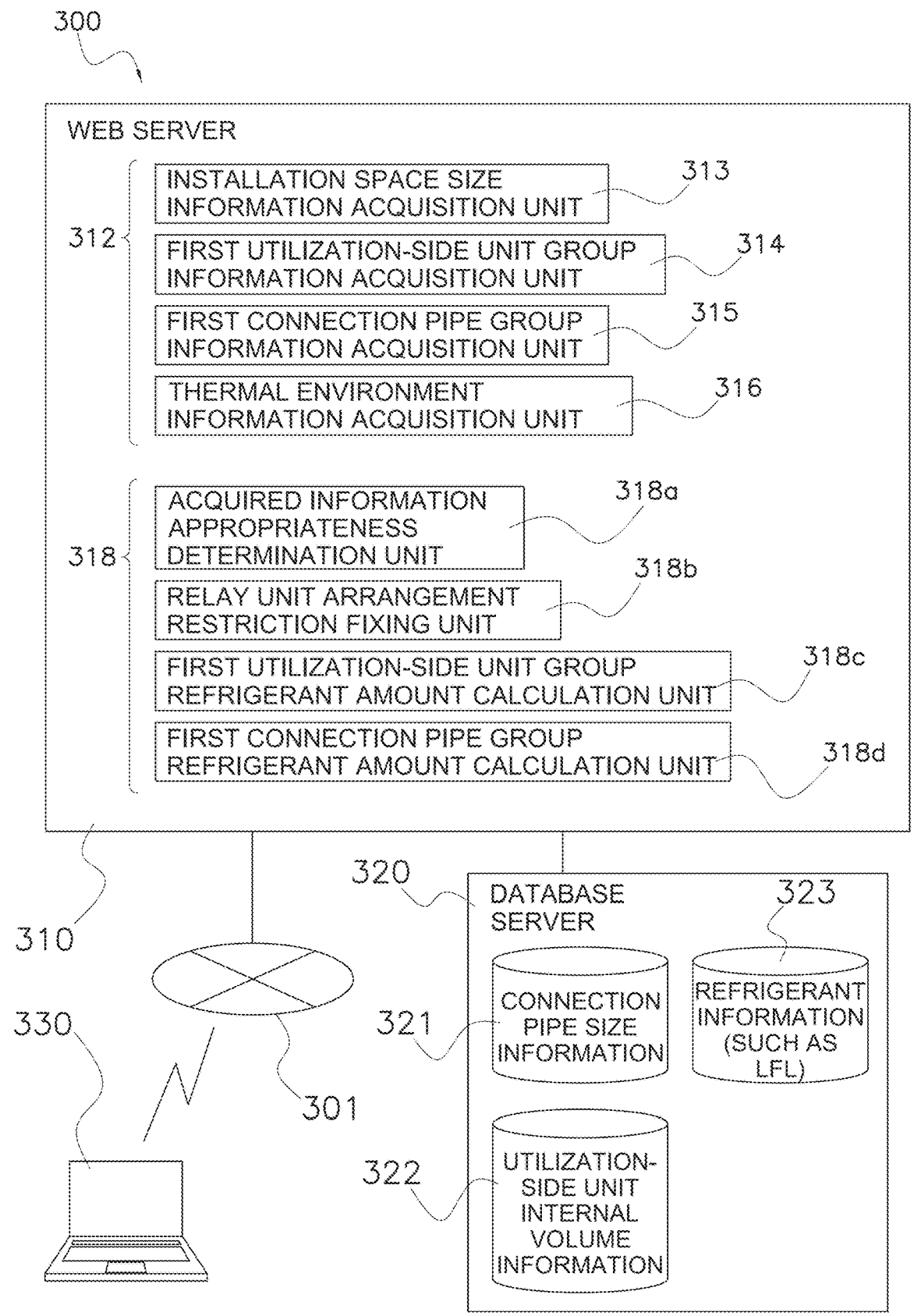
FIG. 4 is a schematic configuration diagram of a design support system for supporting design of the air conditioning apparatus.

The air conditioning apparatus 1 according to one or more embodiments is designed with a design support system 300 (see FIG. 4). The design support system 300 is capable of designing the air conditioning apparatus 1 while testing various design variations, such as pipe diameters and lengths of refrigerant connection pipes relevant to arrangement of relay units, and changes in utilization-side units to be associated with each relay unit.

(4-2-1) Configuration of Design Support System

As illustrated in FIG. 4, the design support system 300 mainly includes a Web server 310 as a computer, a user terminal 330 capable of accessing the Web server 310 via a communication line 301 such as the Internet, and a database server 320 connected to the Web server 310.

(4-2-1-1) Web Server

The Web server 310 includes a control processing device and a storage device (i.e., storage). The control processing device may be a processor such as a central processing unit (CPU) or a graphics processing unit (GPU). The control processing device reads a design support program from the storage device, and executes predetermined image processing and arithmetic processing in accordance with this program. In addition, the control processing device writes a result of the arithmetic processing into the storage device, and reads information from the storage device, in accordance with this program. FIG. 4 illustrates various functional blocks implemented by the control processing device.

As illustrated in FIG. 4, the Web server 310 includes an information acquisition unit 312 and a useful information presentation unit 318 as an aggregate of functional blocks. When the user terminal 330 as a client accesses the Web server 310, the Web server 310 receives information and settings from the user terminal 330, and gives a screen including useful information and the like to the user terminal 330.

(4-2-1-1-1) Information Acquisition Unit

The information acquisition unit 312 includes, as functional blocks, an installation space size information acquisition unit 313, a first utilization-side unit group information acquisition unit 314, a first connection pipe group information acquisition unit 315, a thermal environment information acquisition unit 316, and the like.

The installation space size information acquisition unit 313 acquires information such as an installation height of the air conditioning apparatus in a room as an installation space, and a floor area and a spatial volume of the room.

The first utilization-side unit group information acquisition unit 314 acquires information on a first utilization-side unit group corresponding to a plurality of utilization-side units disposed downstream (i.e., on the opposite side to the heat source-side unit 2) of one relay unit (e.g., the relay unit 4A described above) including a shut-off valve. In the air conditioning apparatus illustrated in FIG. 3A and an air conditioning apparatus illustrated in FIG. 6 (to be described later), the utilization-side units 3a and 3b disposed downstream of one relay unit 4A are called a first utilization-side unit group 81. The first utilization-side unit group information acquisition unit 314 acquires a volume, a capability (a capacity), model information, and the like of a refrigerant circuit in the first utilization-side unit group 81.

The first connection pipe group information acquisition unit 315 acquires information on a connection pipe group connecting a plurality of utilization-side units disposed downstream of one relay unit and the relay unit. As described above, the first connection pipe group (5ab, 5a, 5b, 6ab, 6a, 6b) connects the relay unit 4A and the two utilization-side units 3a and 3b (the first utilization-side unit group 81). The first connection pipe group information acquisition unit 315 acquires information on pipe lengths and pipe sizes (e.g., inner diameters) in the first connection pipe group.

The thermal environment information acquisition unit 316 acquires a thermal environment of a place where the air conditioning apparatus is installed. Information on a thermal environment to be acquired by the thermal environment information acquisition unit 316 in a case where the air conditioning apparatus is installed in a cold region is different from a thermal environment to be acquired by the thermal environment information acquisition unit 316 in a case where the air conditioning apparatus is installed in a hot region such as a country near the equator.

(4-2-1-1-2) Useful Information Presentation Unit

The useful information presentation unit 318 calculates information useful for a user as a designer of the air conditioning apparatus, based on various kinds of information acquired by the information acquisition unit 312 and various kinds of information previously stored in the database server 320, and presents the information thus calculated to the user. The useful information presentation unit 318 includes, as functional blocks, an acquired information appropriateness determination unit 318a, a relay unit arrangement restriction fixing unit 318b, a first utilization-side unit group refrigerant amount calculation unit 318c, a first connection pipe group refrigerant amount calculation unit 318d, and the like.

The acquired information appropriateness determination unit 318a determines whether acquired information is suitable for design of the air conditioning apparatus from the viewpoint of an allowable amount of the refrigerant leaking into the room where the air conditioning apparatus is installed, based on information acquired by the first utilization-side unit group information acquisition unit 314 and information acquired by the first connection pipe group information acquisition unit 315.

The relay unit arrangement restriction fixing unit 318b fixes a restriction on arrangement of the relay unit for blocking the refrigerant, from the viewpoint of an allowable amount of the refrigerant leaking into the room where the air conditioning apparatus is installed, based on information acquired by the first utilization-side unit group information acquisition unit 314 and information acquired by the first connection pipe group information acquisition unit 315.

The first utilization-side unit group refrigerant amount calculation unit 318c calculates a total amount of the refrigerant in the utilization-side refrigerant circuits of the utilization-side units in the first utilization-side unit group, based on information acquired by the first utilization-side unit group information acquisition unit 314 and information acquired by the thermal environment information acquisition unit 316. Specifically, the first utilization-side unit group refrigerant amount calculation unit 318c assumes a state in which the largest amount of refrigerant flows through the utilization-side refrigerant circuits of the utilization-side units in the first utilization-side unit group, in accordance with a thermal environment, and calculates a total amount of the refrigerant in the utilization-side refrigerant circuits under such a severe condition.

The first connection pipe group refrigerant amount calculation unit 318d calculates a total amount of the refrigerant in the first connection pipe group, based on information acquired by the first connection pipe group information acquisition unit 315 and information acquired by the thermal environment information acquisition unit 316. Specifically, the first connection pipe group refrigerant amount calculation unit 318d assumes a state in which the largest amount of refrigerant flows through the first connection pipe group, in accordance with a thermal environment, and calculates a total amount of the refrigerant in the first connection pipe group under such a severe condition.

(4-2-1-2) Database Server

The database server 320 stores therein, for example, connection pipe size information 321 on sizes (e.g., inner diameters) of various connection pipes, utilization-side unit internal volume information 322 on internal volumes of utilization-side refrigerant circuits in utilization-side units for each capacity and for each type, and refrigerant information 323 on an LFL fixed for each refrigerant. When a new utilization-side unit or a new refrigerant is added, the information in the database server 320 is updated.

(4-2-1-3) User Terminal

The user terminal 330 is, for example, a personal computer, a tablet terminal, or a smartphone which the user uses in a design room or a place where the air conditioning apparatus is installed. The user accesses the Web server 310 by means of the program installed in the user terminal 330, an applet, or a browser to use the design support program in the Web server 310. The user terminal 330 displays on its screen various kinds of information calculated and presented by the design support program in the Web server 310. In other words, the Web server causes a display of the user terminal 330 to display information.

(4-2-2) Exemplary Design Using Design Support System

Figure 5:
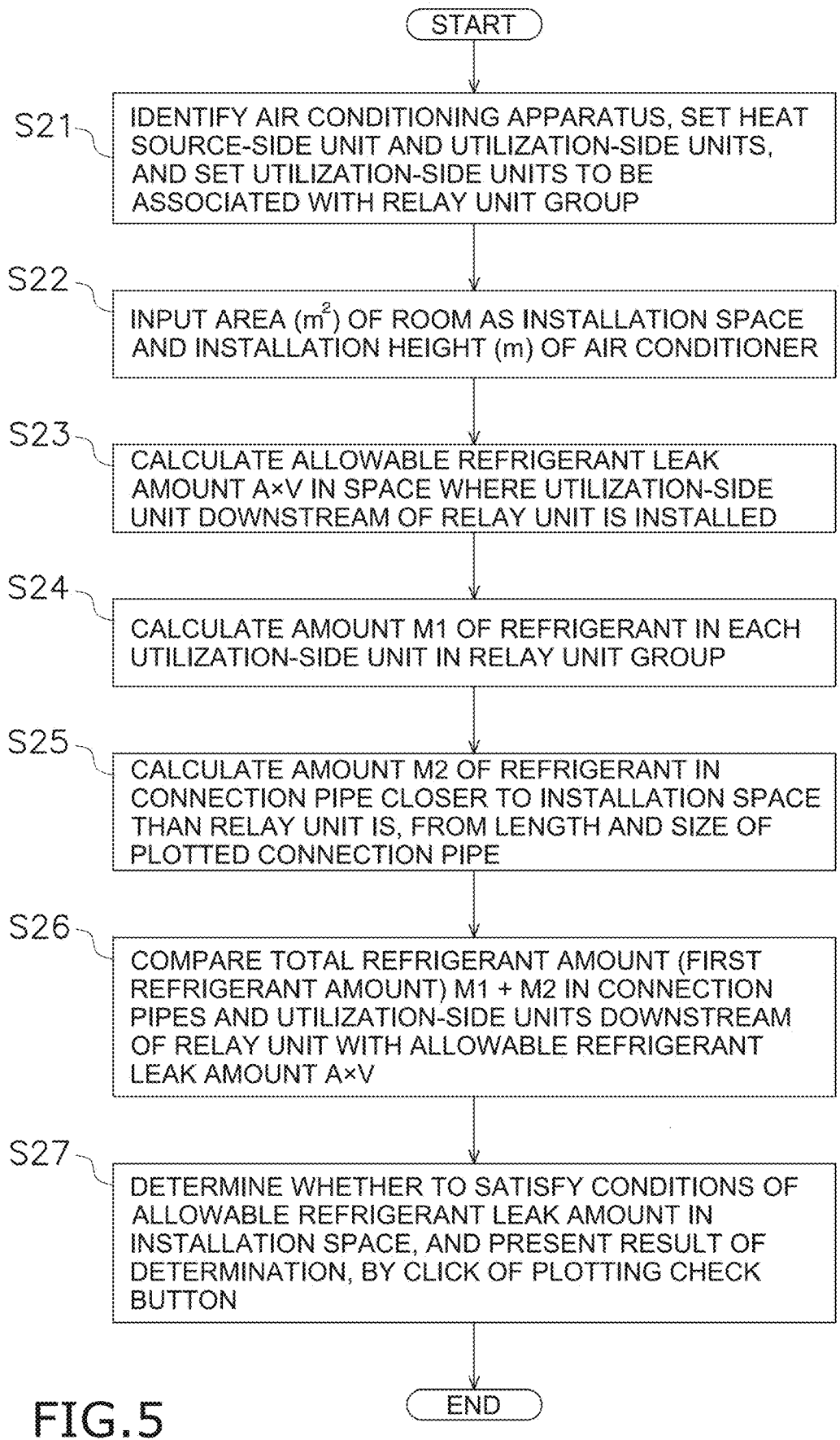
FIG. 5 is a flowchart of a design method using the design support system.

With reference to FIG. 5, next, a description will be given of exemplary design by the user of the design support system 300 with the design support program in the Web server 310.

The foregoing items (1) to (4-1) regarding the air conditioning apparatus 1 each describe the air conditioning apparatus 1 including the two utilization-side units 3a and 3b (the first utilization-side unit group 81) disposed downstream of the relay unit 4A and the two utilization-side units 3c and 3d disposed downstream of the relay unit 4B (see FIG. 3A). In the following exemplary design by the user of the design support system 300, on the assumption that the user designs the air conditioning apparatus illustrated in FIG. 6, a description will be given of how to use the design support system at the time when designing the air conditioning apparatus. It is assumed that an initial policy of designing the air conditioning apparatus illustrated in FIG. 6 involves disposing the two utilization-side units 3a and 3b (the first utilization-side unit group 81) downstream of the relay unit 4A, disposing three utilization-side units 3c, 3d, and 3e downstream of the relay unit 4B, and disposing one utilization-side unit 3f downstream of a relay unit 4F. The relay unit 4F is similar in configuration to the relay units 4A and 4B described above. The utilization-side units 3e and 3f are similar in configuration to the utilization-side units 3a, 3b, 3c, and 3d described above. The utilization-side unit 3a, the utilization-side unit 3b, the utilization-side unit 3c, the utilization-side unit 3d, the utilization-side unit 3e, and the utilization-side unit 3f are respectively installed on the ceiling of an office kitchenette, the ceiling of a boardroom, the ceiling of a second drawing room, the ceiling of a first drawing room, the ceiling of a third drawing room, and the ceiling of a fourth drawing room.

(4-2-2-1) Operation by User and Processing in Web Server

FIG. 5 illustrates a schematic flow of exemplary design using the design support system 300.

Figure 6:
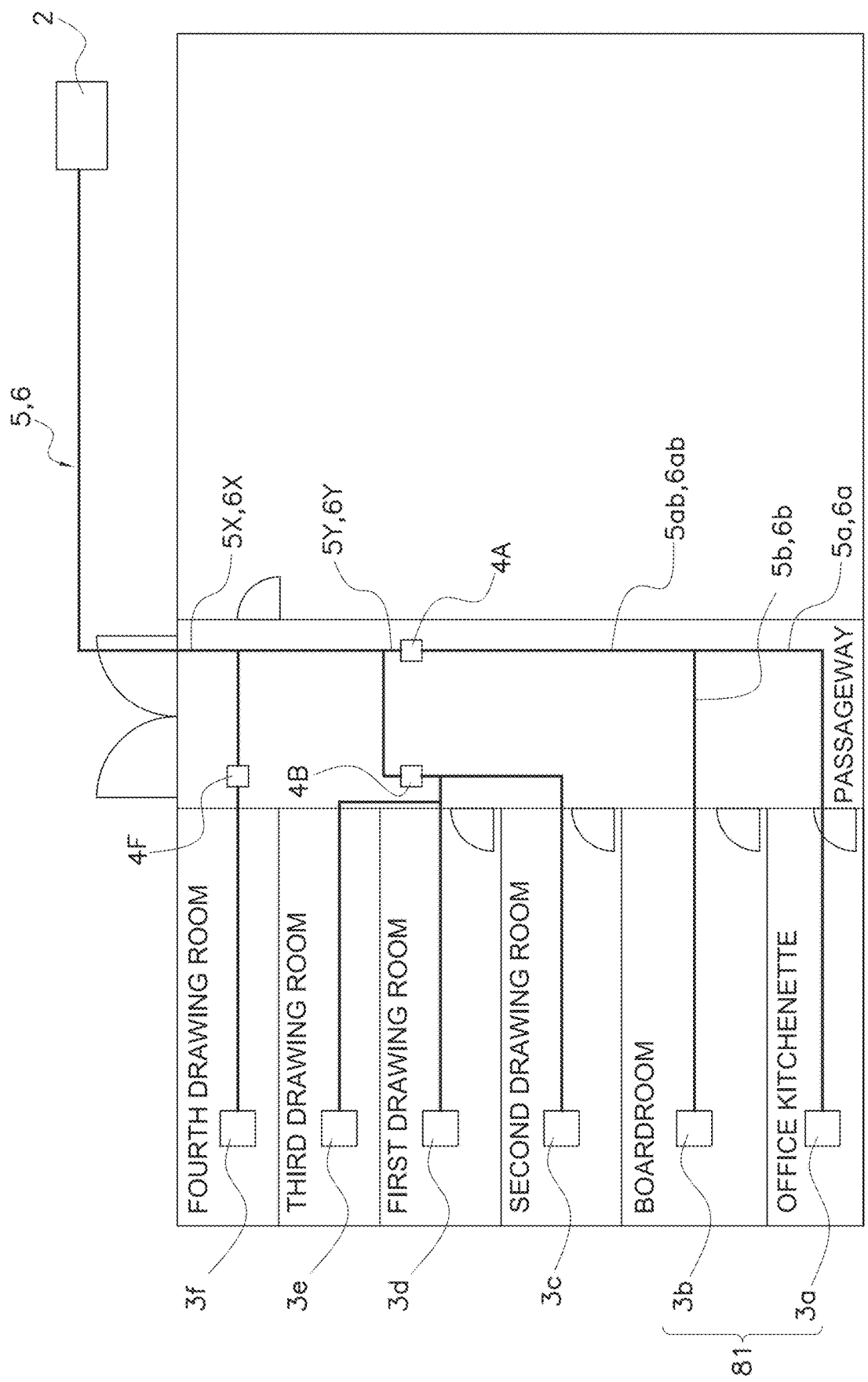
FIG. 6 is a diagram of an exemplary basic configuration of an air conditioning apparatus designed using the design support system.
Figure 7A:
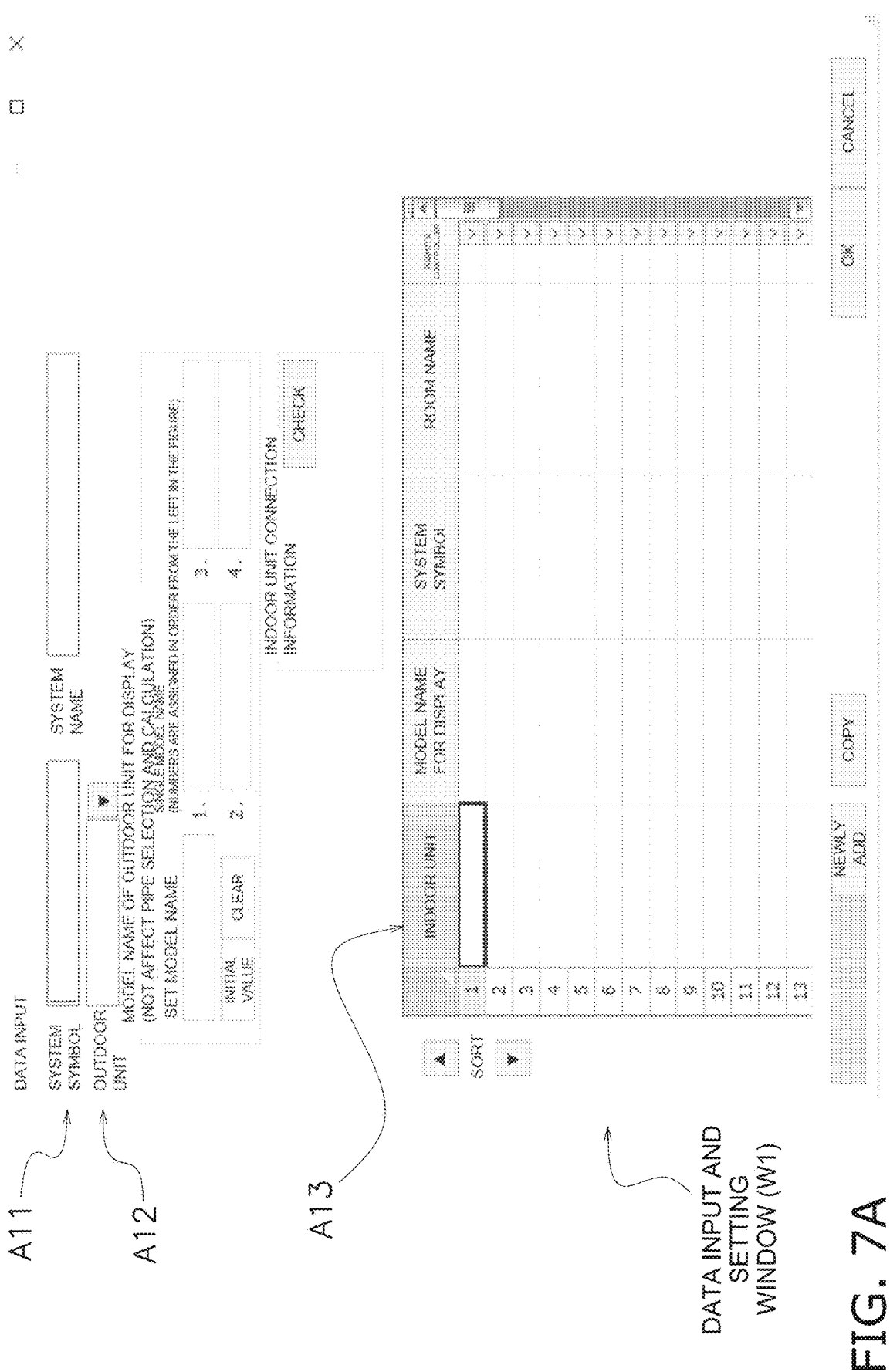
FIG. 7A is a diagram of an exemplary display screen by a computer program in the design support system.

First, the user inputs a system symbol of an air conditioning apparatus, in an input area A11 on a screen (see FIG. 7A) displayed on a display of the user terminal 330. FIG. 7A illustrates a data input and setting window W1 provided by the design support program in the Web server 310. The heat source-side unit 2 and the utilization-side units 3a to 3f illustrated in FIG. 6 constitute one refrigerant system in the air conditioning apparatus, the air conditioning apparatus illustrated in FIG. 6 one refrigerant system. In view of this, the user inputs a system symbol for identifying an air conditioning apparatus, in the input area A11.

In addition, the user selectively inputs a model number of an outdoor unit as the heat source-side unit 2 of the air conditioning apparatus, in an input area A12 on the screen illustrated in FIG. 7A. The user selectively inputs a model number of an outdoor unit, from a pulldown menu of model numbers stored in the database server 320.

The user inputs a model number of an indoor unit as each of the utilization-side units of the air conditioning apparatus, in an input area A13 on the screen illustrated in FIG. 7A. The model number which the user inputs is acquired by the first utilization-side unit group information acquisition unit 314 of the Web server 310. The first utilization-side unit group information acquisition unit 314 of the Web server 310 retrieves information relative to the model number of the indoor unit as the utilization-side unit, from the utilization-side unit internal volume information 322 stored in the database server 320.

Figure 7B:
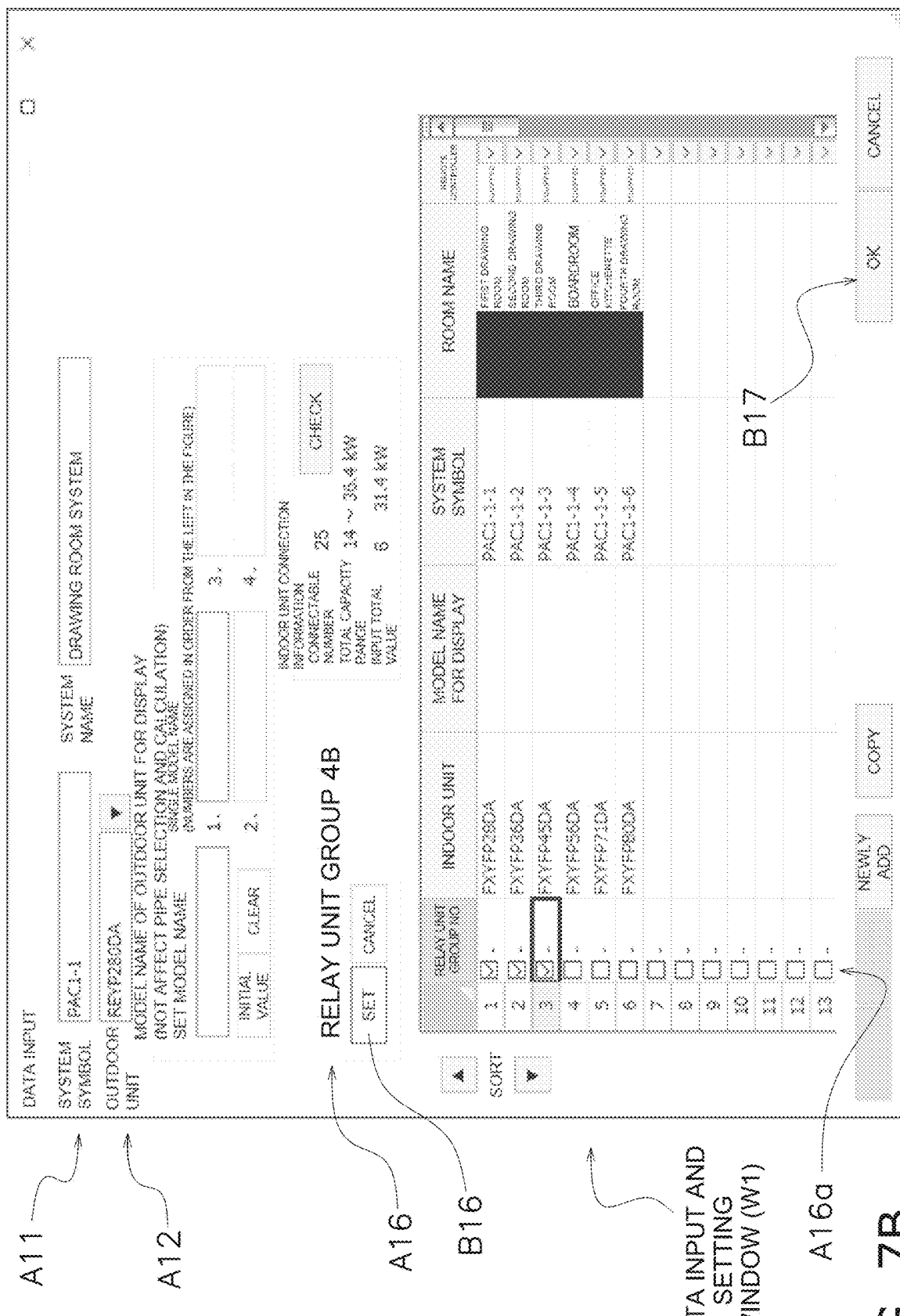
FIG. 7B is a diagram of an exemplary display screen by the computer program in the design support system.
Figure 7C:
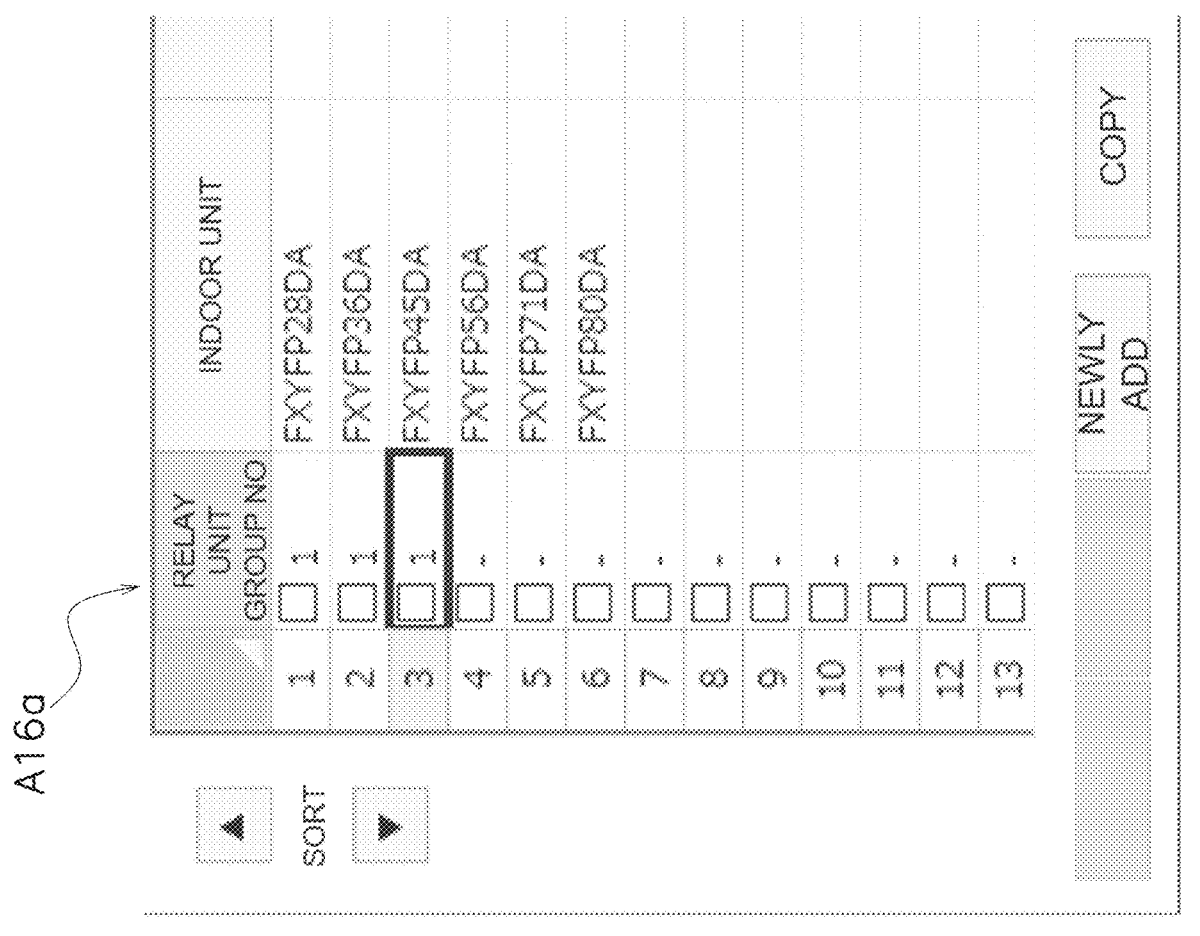

Next, when the user selects settings on a relay unit group, from a window (not illustrated) different from the data input and setting window W1, an input and setting area A16 and a setting button B16 concerning a relay unit are displayed on the data input and setting window W1 as illustrated in FIG. 7B. For example, if the user intends to make settings on the relay unit 4B, the user performs data input concerning a relay unit group 4B. In an input area A16a on a screen illustrated in FIG. 7C (a partially enlarged diagram of FIG. 7B), when the user selects a utilization-side unit (an indoor unit) to be disposed downstream of the relay unit 4B, the relay unit 4B is associated with the utilization-side unit, so that a relay unit group is created. For example, when the user selects three utilization-side units and clicks the setting button B16, the relay unit 4B and the three utilization-side units are registered as one group.

The foregoing input and setting operations correspond to step S21 in FIG. 5.

Next, the user inputs a name of a room as a space where each of the utilization-side units (indoor units) is installed. The user inputs a name of a room in an input area A14 on a screen illustrated in FIG. 7D. For example, the user inputs a room name "second drawing room" to a box A14b in the input area A14.

Next, the user inputs a floor area of each room and an installation height of the corresponding utilization-side unit (the indoor unit). In a state in which the user selects the box A14b on the screen illustrated in FIG. 7D, alternatives of a floor area and alternatives of an installation height of each utilization-side unit are displayed in an input area A15 on the screen illustrated in FIG. 7D. The user is able to perform data input by selecting one of the alternatives. The information on the floor area of each room and the information on the installation height of the corresponding utilization-side unit which the user inputs are acquired by the installation space size information acquisition unit 313 of the Web server 310.

In a case where a utilization-side unit is installed on the ceiling of a room, the user inputs a height from the floor surface to the ceiling, as an installation height of the utilization-side unit. If the user intends to input the dimensions more specifically, the user inputs a height dimension from the floor surface to an assumed position at which leakage of a refrigerant occurs.

The foregoing input and setting operations correspond to step S22 in FIG. 5.

Next, when the user clicks a button B17 in the data input and setting window W1 illustrated in FIG. 7B, the data input and setting operations end. The design support program in the Web server 310 then causes the display of the user terminal 330 to display thereon a plotting window W2 illustrated in FIG. 7E. The plotting window W2 displays images of the heat source-side unit 2, relay units 4A, 4B, and 4F, utilization-side units 3a to 3f, and refrigerant connection pipes which the user has already input. When the user clicks a button B18 in the plotting window W2, input window W3 of a new connection pipe length (a length of a refrigerant connection pipe) is opened as illustrated in FIG. 7F. The user inputs a length of each gas-side refrigerant connection pipe and a length of each liquid-side connection pipe, in this input window W3. It should be noted that the design support program in the Web server 310 automatically fixes a pipe diameter (a pipe size) of a refrigerant connection pipe in accordance with a capacity of the heat source-side unit 2 and a capacity of each utilization-side unit.

When the user finishes the data input in the connection pipe length input window W3 illustrated in FIG. 7F, and then clicks a button B19, the input information is acquired by the first connection pipe group information acquisition unit 315 of the Web server 310. A warning window W4 illustrated in FIG. 7G is opened instead of the connection pipe length input window W3, on the display of the user terminal 330. The warning window W4 indicates that leakage of the refrigerant does not satisfy an allowable level in a predetermined room ("office kitchenette" in FIG. 7G) as a space where a corresponding one or more utilization-side units of the air conditioning apparatus is installed. In accordance with the warning window W4, the user determines that the number of utilization-side units to be disposed downstream of the relay unit 4A is too large or determines that the total length of the refrigerant connection pipes (a first refrigerant connection pipe group) to be located downstream of the relay unit 4A is too long. The user then returns the screen to the screen illustrated in FIG. 7C to change the number of utilization-side units to be disposed downstream of the relay unit 4A, or returns the screen to the screen illustrated in FIG. 7F to change the lengths of the refrigerant connection pipes to be located downstream of the relay unit 4A. The change in lengths of the refrigerant connection pipes to be located downstream of the relay unit 4A means a change in arrangement of the relay unit 4A.

As a matter of course, the warning window W4 illustrated in FIG. 7G is not opened if the leakage of the refrigerant satisfies the allowable level in all the rooms as the spaces where the utilization-side units of the air conditioning apparatus are installed.

(4-2-2-2) Determination as to Whether Leakage of Refrigerant Satisfies Allowable Level, Using Design Support Program The creation and display of the warning window W4 (FIG. 7G) using the design support program in the Web server 310 are made by the corresponding functional blocks of the Web server 310 through the following calculations. With reference to FIG. 6, next, a description will be given of the calculations, with the first utilization-side unit group 81 (the utilization-side units 3a and 3b) located downstream of the relay unit 4A as an example.

First, the acquired information appropriateness determination unit 318a of the Web server 310 selects the "office kitchenette" having the smallest floor area between the rooms where the first utilization-side unit group 81 (the utilization-side units 3a and 3b) are installed, as a room for which safety measures are should be taken. In one or more embodiments, a room having the smallest floor area is a room having the smallest spatial volume. Next, the Web server 310 calculates a volume V (m³) of the internal space of the "office kitchenette". The volume V (m³) is calculated by multiplying the floor area of the office kitchenette and the ceiling height of the office kitchenette together. In one or more embodiments, the volume V (m³) of the internal space of the "office kitchenette" is calculated from the values input in the input area A15 on the screen illustrated in FIG. 7D.

Next, the Web server 310 calculates an allowable refrigerant leak amount A (kg/m³) per unit volume of the room. One of conditions for the calculation is a refrigerant type. The LFL described above changes depending on a refrigerant type (e.g., R32, R1234yf, etc.). A safety factor, which is one of the conditions for the calculation, is set at, for example, 4. In a case where each room is ventilated, a ventilation amount may be defined as one of the conditions for the calculation.

The allowable refrigerant leak amount A×V (kg) in the "office kitchenette" is calculated by multiplying the volume V (m³) of the "office kitchenette" and the allowable refrigerant leak amount A (kg/m³) per unit volume together.

The foregoing operations correspond to step S23 in FIG. 5.

Next, the first utilization-side unit group refrigerant amount calculation unit 318c of the Web server 310 calculates a total amount M1 (kg) of the refrigerant in the utilization-side refrigerant circuits 13a and 13b of the utilization-side units 3a and 3b in the first utilization-side unit group 81 illustrated in FIG. 6. This calculation is made using the internal volumes of the utilization-side refrigerant circuits 13a and 13b of the utilization-side units 3a and 3b. The internal volumes are stored in the database server 320. The first utilization-side unit group refrigerant amount calculation unit 318c of the Web server 310 calculates the total amount M1 (kg) of the refrigerant in the utilization-side refrigerant circuits 13a and 13b, on the assumption that the refrigerant is present in a predetermined state in each of the utilization-side refrigerant circuits 13a and 13b of the utilization-side units 3a and 3b. In this calculation, a thermal environment of a region where the air conditioning apparatus is installed is considered as described above. The thermal environment refers to, for example, an environment of a region where the air conditioning apparatus is installed, such as a hot country near the equator or a cold region where an outside temperature is below −10° C. in winter. An air conditioning operation differs between a region near the equator and a cold region. Specifically, a target refrigerant temperature at a utilization-side heat exchanger of a utilization-side unit differs between a region near the equator and a cold region. This results in changes in amounts of the refrigerant in the utilization-side refrigerant circuits 13a and 13b of the utilization-side units 3a and 3b and amount of the refrigerant in the first connection pipe group (5ab, 5a, 5b, 6ab, 6a, 6b). In view of this, the amounts of the refrigerant in the utilization-side refrigerant circuits 13a and 13b are calculated based on a thermal environment of a region where the air conditioning apparatus is installed. Information on a thermal environment of a region where the air conditioning apparatus is installed is previously acquired by the thermal environment information acquisition unit 316 of the Web server 310. For example, in the upper display screen of the data input and setting window W1 illustrated in FIG. 7A, the user inputs information on a thermal environment, in conjunction with information on an address and a name of a building in which the air conditioning apparatus is installed.

Examples of the conditions for the calculation of the total amount M1 (kg) of the refrigerant in the utilization-side refrigerant circuits 13a and 13b may include, but not limited to, a condition concerning a heating operation, a condition that a condensation temperature at a utilization-side heat exchanger is 46° C. in the heating operation, a condition that a target degree of subcooling is 5° C. in the heating operation, a condition concerning a density of the refrigerant in the liquid-side refrigerant connection pipe 5, and a condition concerning a density of the refrigerant in the gas-side refrigerant connection pipe 6. The condition concerning the heating operation refers to a condition of an operation that increases the amounts of the refrigerant in the utilization-side refrigerant circuits 13a and 13b, depending on a region. These conditions for each thermal environment are incorporated in the design support program in the Web server 310.

The foregoing operations correspond to step S24 in FIG. 5.

The first connection pipe group refrigerant amount calculation unit 318d of the Web server 310 also calculates an amount M2 (kg) of the refrigerant in the first connection pipe group (5ab, 5a, 5b, 6ab, 6a, 6b) connecting the relay unit 4A and the first utilization-side unit group 81 (the utilization-side units 3a and 3b). This calculation is made by a conversion from the pipe diameter and pipe length of the first connection pipe group (5ab, 5a, 5b, 6ab, 6a, 6b). The thermal environment of the region where the air conditioning apparatus is installed is also considered for the calculation of the amount M2 (kg) of the refrigerant in the first connection pipe group (5ab, 5a, 5b, 6ab, 6a, 6b).

The foregoing operations correspond to step S25 in FIG. 5.

Next, the acquired information appropriateness determination unit 318a of the Web server 310 determines whether a sum of the total amount M1 (kg) of the refrigerant in the first utilization-side unit group 81 and the amount M2 (kg) of the refrigerant in the first connection pipe group (5ab, 5a, 5b, 6ab, 6a, 6b) is larger or smaller than the allowable refrigerant leak amount A×V (kg) in the "office kitchenette". In other words, the acquired information appropriateness determination unit 318a of the Web server 310 determines whether the following relationship (1) is satisfied.

$$M1+M2 \le A \times V \quad (1)$$

When the relationship (1) is not satisfied, and the sum of M1 and M2 (kg) exceeds the allowable refrigerant leak amount A×V (kg), the acquired information appropriateness determination unit 318a of the Web server 310 determines that the leak of the refrigerant exceeds the allowable level. When the relationship (1) is satisfied, the acquired information appropriateness determination unit 318a of the Web server 310 determines that the leakage of the refrigerant is within a range of the allowable level. When the acquired information appropriateness determination unit 318a of the Web server 310 determines that the leak of the refrigerant exceeds the allowable level, the warning window W4 (FIG. 7G described above) is created and displayed on the display of the user terminal 330.

The foregoing operations correspond to steps S26 and S27 in FIG. 5.

(5) Features (5-1)

As described above, a design support system 300 is a system for supporting design of an air conditioning apparatus as a refrigerant cycle apparatus.

As illustrated in, for example, FIG. 6, the air conditioning apparatus includes a plurality of utilization-side units 3a to 3f, a heat source-side unit 2, refrigerant connection pipes 5 and 6, and relay units 4A, 4B, and 4F each serving as a refrigerant shut-off unit. The plurality of utilization-side units 3a to 3f include a first utilization-side unit group 81. The first utilization-side unit group 81 is a group of two utilization-side units 3a and 3b. The relay unit 4A blocks a flow of a refrigerant between utilization-side refrigerant circuits 13a and 13b in the first utilization-side unit group 81 and a heat source-side refrigerant circuit 12 of the heat source-side unit 2. The refrigerant connection pipes 5 and 6 include a first connection pipe group (5ab, 5a, 5b, 6ab, 6a, 6b). The first connection pipe group (5ab, 5a, 5b, 6ab, 6a, 6b) is a group of connection pipes connecting the utilization-side refrigerant circuits 13a and 13b in the first utilization-side unit group 81 and the relay unit 4A.

The design support system 300 includes an information acquisition unit 312 and a useful information presentation unit 318. The information acquisition unit 312 includes a first utilization-side unit group information acquisition unit 314 that acquires information on each of the utilization-side units 3a and 3b in the first utilization-side unit group 81. The information acquisition unit 312 includes a first connection pipe group information acquisition unit 315 that acquires information on a pipe length and a pipe size of the first connection pipe group (5ab, 5a, 5b, 6ab, 6a, 6b). The useful information presentation unit 318 includes an acquired information appropriateness determination unit 318a that makes a determination as to appropriateness of design information which a user inputs (e.g., information on the utilization-side units 3a and 3b, information on the first connection pipe group (5ab, 5a, 5b, 6ab, 6a, 6b), size information on an installation space) in view of allowable leakage of the refrigerant in a space where a corresponding one of the utilization-side units 3a and 3b in the first utilization-side unit group 81 is installed, and presents a result of the determination as useful information (see FIG. 7G).

With this configuration, the user is able to design the air conditioning apparatus while testing various design variations, in fixing arrangement of the relay unit 4A and fixing a type and a number of utilization-side units to be disposed downstream of the relay unit 4A. As shown in FIGS. 3A and 3B, the air conditioning apparatus may include more than one relay unit. Accordingly, the number of utilization-side units to be disposed downstream of the relay unit 4A may be smaller than the total number of utilization-side units in the air conditioning apparatus. For example, using the design support system 300, the user changes the arrangement of the relay unit 4A to change the length of the first connection pipe group (5ab, 5a, 5b, 6ab, 6a, 6b) or changes the design such that the utilization-side unit 3b disposed downstream of the relay unit 4A is disposed downstream of another relay unit, in accordance with the warning window W4 on the screen illustrated in FIG. 7G. The user then clicks the "check" button again to obtain a result of a determination as to whether a total amount (kg) of the refrigerant in the first utilization-side unit group and first connection pipe group disposed downstream of the changed relay unit 4A falls below the allowable refrigerant leak amount A×V (kg) in the "office kitchenette".

(5-2)

The design support system 300 includes a Web server 310 that stores therein a design support program involving calculation based on a thermal environment of a region where the air conditioning apparatus is installed, in finding (calculating) a total amount M1 (kg) of the refrigerant in the utilization-side refrigerant circuits 13a and 13b and an amount M2 (kg) of the refrigerant in the first connection pipe group (5ab, 5a, 5b, 6ab, 6a, 6b). This calculation considers, for example, a condition concerning a heating operation, a condition that a condensation temperature at a utilization-side heat exchanger is 46° C. in the heating operation, a condition that a target degree of subcooling is 5° C. in the heating operation, a condition concerning a density of the refrigerant in the liquid-side refrigerant connection pipe 5, and a condition concerning a density of the refrigerant in the gas-side refrigerant connection pipe 6. Among the conditions, for example, the condition concerning the condensation temperature at the utilization-side heat exchanger in the heating operation differs between a thermal environment in a cold region and a thermal environment in a hot region.

Therefore, the design support system 300 configured to perform calculation based on information on a thermal environment acquired by a thermal environment information acquisition unit 316 of the Web server 310 attains a calculation result of an appropriate refrigerant amount according to a place where the air conditioning apparatus is installed, as compared with a case where the design support system 300 uniformly calculates the refrigerant amounts M1 and M2, based on a condition of an excessive thermal environment.

(6) Modifications
(6-1) Modification 1

According to one or more embodiments, the acquired information appropriateness determination unit 318a of the design support system 300 makes a determination as to appropriateness of design information which the user inputs (e.g., information on the utilization-side units 3a and 3b, information on the first connection pipe group (5ab, 5a, 5b, 6ab, 6a, 6b), size information on the installation space), and presents a result of the determination to the user as useful information in the form of the warning window W4 illustrated in FIG. 7G.

In place of this configuration or in addition to this configuration, the design support system 300 may calculate a restriction on the arrangement of the relay unit 4A as the refrigerant shut-off unit and present a result of the calculation to the user.

As illustrated in FIG. 4, the useful information presentation unit 318 of the Web server 310 includes the relay unit arrangement restriction fixing unit 318b as a functional block. The design support program in the Web server 310 of the design support system 300 may achieve presentation of useful information by the relay unit arrangement restriction fixing unit 318b, in place of presentation of useful information by the acquired information appropriateness determination unit 318a.

After steps S21 to S24 in FIG. 5 describe above, the relay unit arrangement restriction fixing unit 318b subtracts the total amount M1 (kg) of the refrigerant in the utilization-side refrigerant circuits 13a and 13b of the utilization-side units 3a and 3b, from the allowable refrigerant leak amount A×V (kg) in the "office kitchenette", thereby calculating a maximum value of the amount of the refrigerant that may be present in the first connection pipe group (5ab, 5a, 5b, 6ab, 6a, 6b). The maximum value of the amount of the refrigerant in the first connection pipe group (5ab, 5a, 5b, 6ab, 6a, 6b) refers to a restriction on the arrangement of the relay unit 4A. This is because the arrangement of the relay unit 4A is strongly related to the length of the first connection pipe group (5ab, 5a, 5b, 6ab, 6a, 6b). When receiving the maximum value of the amount of the refrigerant in the first connection pipe group (5ab, 5a, 5b, 6ab, 6a, 6b) from the relay unit arrangement restriction fixing unit 318b, the user searches for arrangement of the relay unit 4A within a range of the restriction on the length of the first connection pipe group (5ab, 5a, 5b, 6ab, 6a, 6b).

The design support system 300 may automatically plot appropriate arrangement of the relay unit 4A as a refrigerant shut-off unit and present the arrangement to the user. In this case, for example, the design support system 300 puts a priority on maintainability of the plurality of relay units 4A, 4B, and 4F and fixes the arrangement of the relay unit 4A within the range of the restriction on the length of the first connection pipe group (5ab, 5a, 5b, 6ab, 6a, 6b) such that the relay units 4A, 4B, and 4F are closely disposed each other.

(6-2) Modification 2

According to one or more embodiments, the acquired information appropriateness determination unit 318a of the design support system 300 makes a determination as to appropriateness of design information which the user inputs (e.g., information on the utilization-side units 3a and 3b, information on the first connection pipe group (5ab, 5a, 5b, 6ab, 6a, 6b), size information on the installation space), and presents a result of the determination to the user as useful information in the form of the warning window W4 illustrated in FIG. 7G.

In place of this configuration, the useful information presentation unit 318 of the Web server 310 in the design support system 300 may present the refrigerant amounts M1 and M2 calculated in steps S24 and S25 describe above to the user as useful information. The useful information presentation unit 318 may alternatively present a sum of the refrigerant amounts M1 and M2 (a first refrigerant amount) to the user as useful information.

In accordance with numerical values of the refrigerant amounts M1 and M2, a somewhat experienced designer is able to determine whether a problem arises in a case where a refrigerant leaks, in view of the sizes of rooms where the utilization-side units 3a and 3b are installed.

(6-3) Modification 3

According to Modification 1, the design support system 300 calculates the restriction on the arrangement of the relay unit 4A as the refrigerant shut-off unit, and presents the result of the calculation to the user as the first information.

In place of this configuration, the design support system 300 may calculate a restriction on an internal volume of the first connection pipe group (5ab, 5a, 5b, 6ab, 6a, 6b) and present a result of the calculation to the user as third information. In accordance with this presentation, the user is able to make a choice of changing the length and pipe diameter of the first connection pipe group (5ab, 5a, 5b, 6ab, 6a, 6b).

The design support system 300 may alternatively present a list of devices of different capacities, the devices being usable as the utilization-side units 3a and 3b, as the useful information (second information), based on a restriction on the internal volumes of the utilization-side refrigerant circuits 13a and 13b of the utilization-side units 3a and 3b rather than the restriction on the arrangement of the relay unit 4A. In accordance with the presentation of the useful information, the user is able to make an examination as to whether the downsizing of the utilization-side unit 3a is possible, in consideration of, for example, a margin from the viewpoint of an air conditioning capacity as to a current capacity of the utilization-side unit 3a installed in the "office kitchenette".

(6-4) Modification 4

According to one or more embodiments, the design support program in the Web server 310 of the design support system 300 causes the data input and setting window W1 to display the input and setting area A16 and the setting button B16 regarding the relay unit as illustrated in FIG. 7B. In the input area A16a, when the user selects a utilization-side unit (an indoor unit) to be disposed downstream of the relay unit 4B, the relay unit 4B is associated with the utilization-side unit, so that a relay unit group is created.

In addition to this configuration, the rooms as spaces where utilization-side units (indoor units) are installed may also be grouped. The reason therefor is as follows. In a case where a partition between two or more rooms is an airy ventilated member such as a partial wall or a shade, an allowable refrigerant leak amount upon leakage of a refrigerant should be calculated by addition of spatial volumes of these rooms. The grouping of the rooms is effective also in a case where multiple utilization-side units (indoor units) are installed in one room.

(6-5) Modification 5

According to one or more embodiments, the warning window W4 illustrated in FIG. 7G is opened when the user clicks the button B19 on the connection pipe length input window W3 illustrated in FIG. 7F. In place of this configuration, when it is determined that the leakage of the refrigerant does not satisfy the allowable level, a warning message may be issued while input numerical values are highlighted red immediately even when the user is inputting the numerical values on the connection pipe length input window W3 illustrated in FIG. 7F.

(6-6) Modification 6

According to one or more embodiments, the design support system 300 is described with the designer of the air conditioning apparatus regarded as the user. In installing the air conditioning apparatus in a worksite (building), the design support system 300 may alternatively be used by a constructor who fixes a path of the connection pipes 5 and 6 and fixes arrangement of the relay units 4A, 4B, and 4F at the worksite. In a case where the user who is the constructor of the air conditioning apparatus uses the design support system 300, the design support system 300 serves as a system for supporting the construction in addition to the design.

(6-7) Modification 7

Figure 7E:
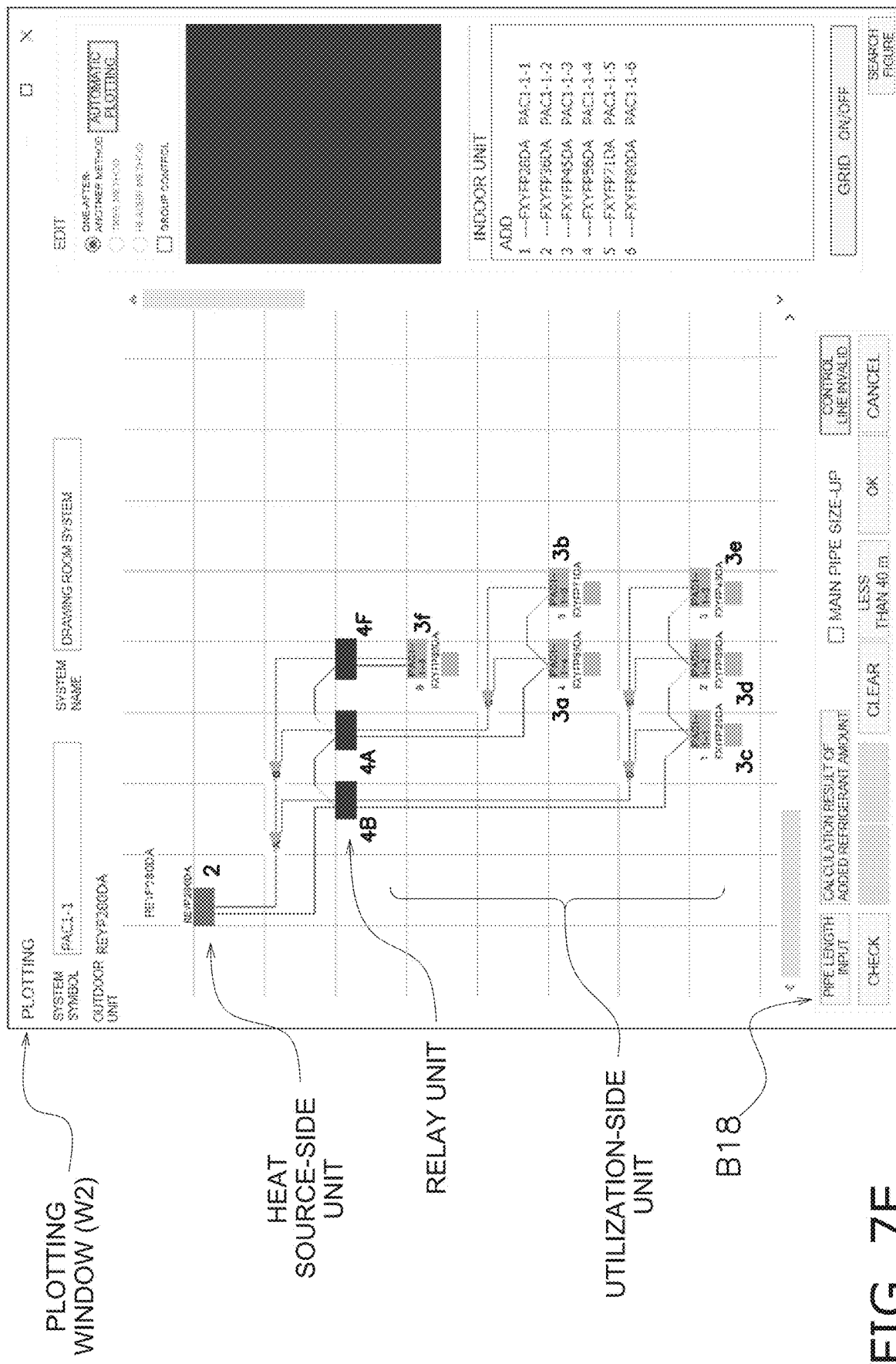
FIG. 7E is a diagram of an exemplary display screen by the computer program in the design support system.
Figure 7F:
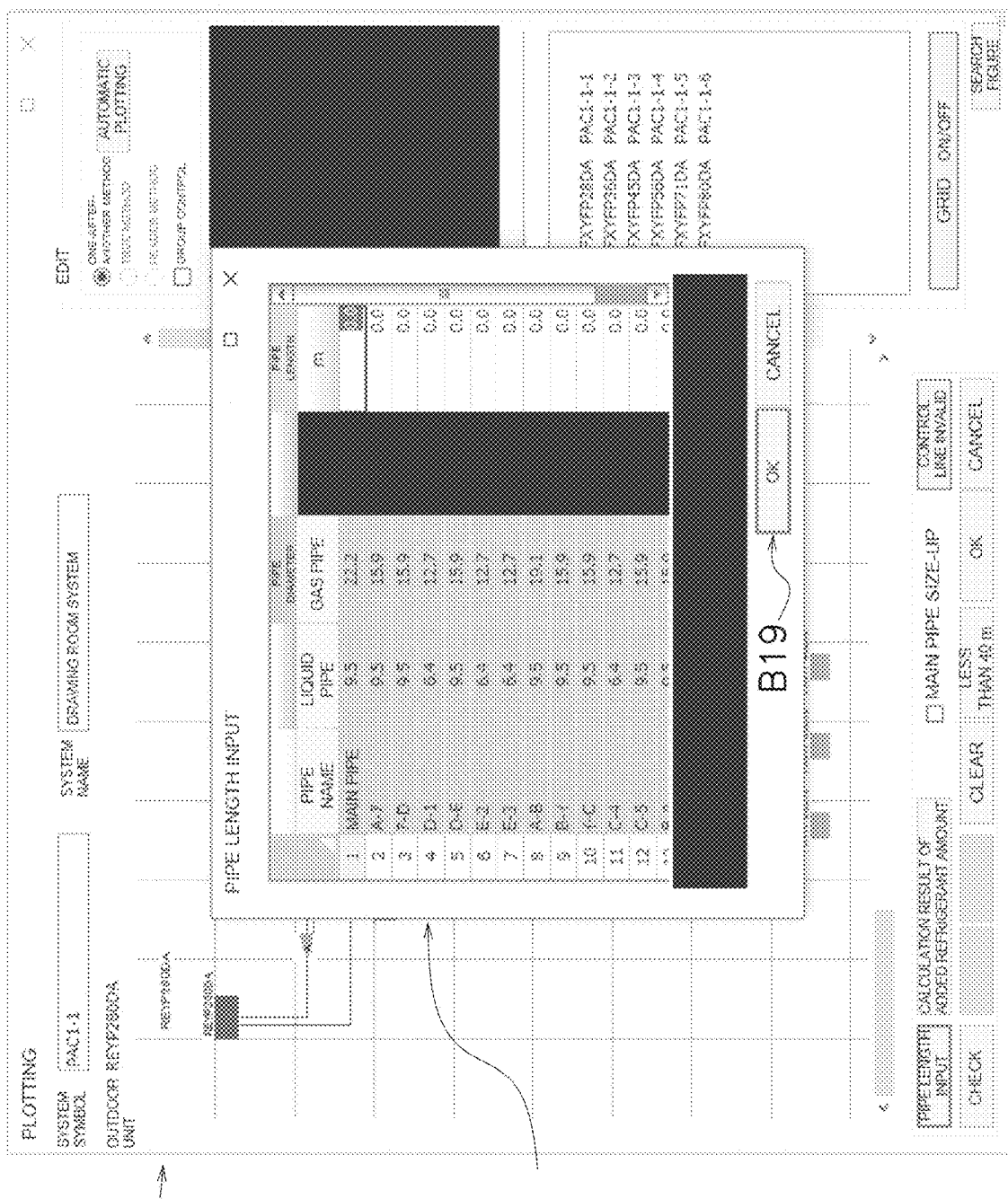
FIG. 7F is a diagram of an exemplary display screen by the computer program in the design support system.
Figure 7G:
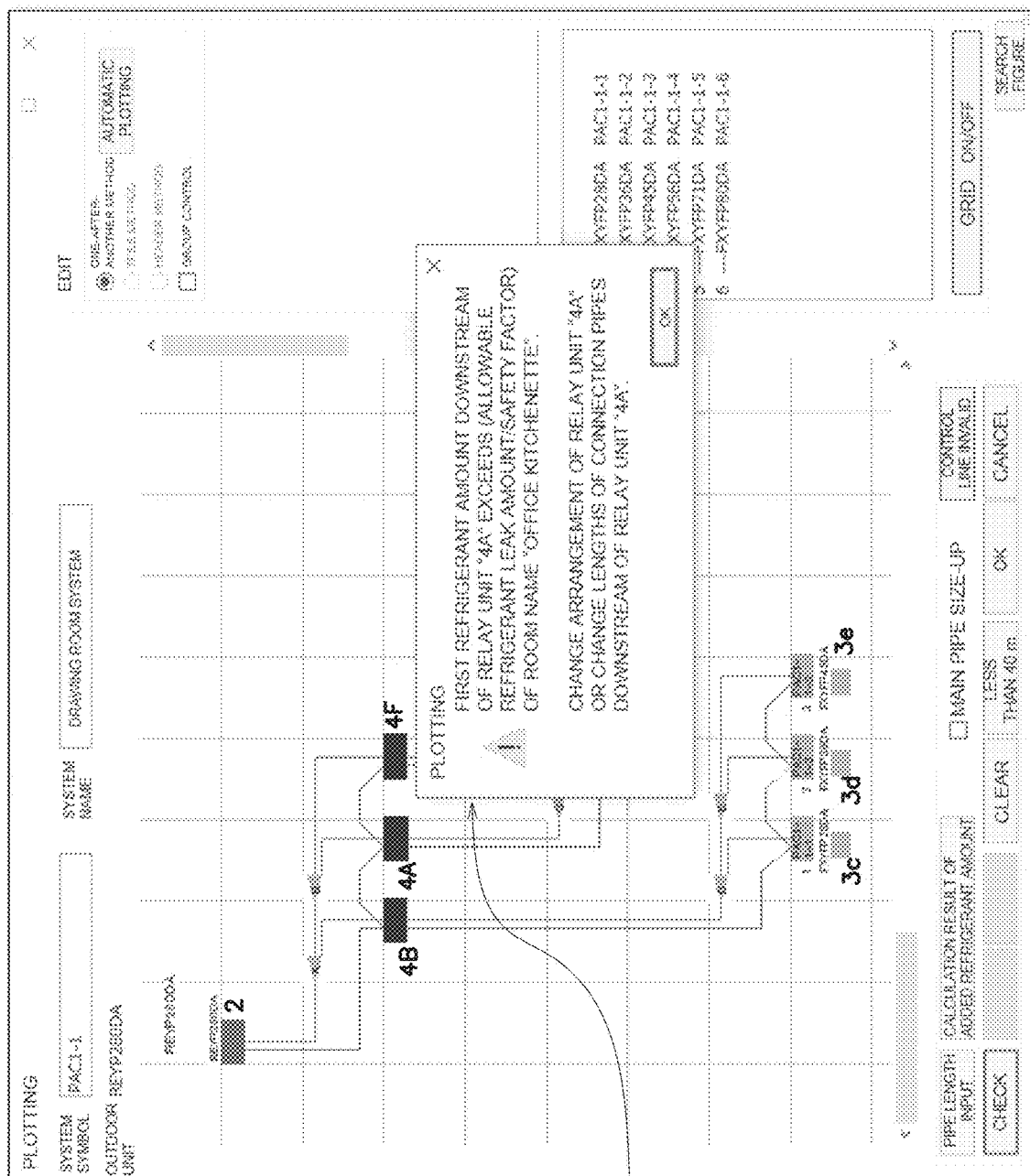
FIG. 7G is a diagram of an exemplary display screen by the computer program in the design support system.

According to one or more embodiments, as illustrated in, for example, FIG. 7E, the design support program in the Web server 310 of the design support system 300 allows display of the two-dimensional plotting window W2. In place of this configuration, the design support program in the Web server 310 of the design support system 300 may allow display of a three-dimensional plotting screen.

(6-8) Modification 8

According to one or more embodiment, the warning window W4 illustrated in FIG. 7G is presented as the useful information to the user by the design support program in the Web server 310 of the design support system 300. In place of this configuration, a series of information items and calculation results, such as the refrigerant amounts M1 and M2, the allowable refrigerant leak amount A×V (kg) in the "office kitchenette", and the input value of the length of the first connection pipe group (5ab, 5a, 5b, 6ab, 6a, 6b), may be collectively output in the form of a graph or a chart. For example, if these information items are available in the form of a list, the user is able to make an examination on, for example, arrangement of the relay unit 4A while checking the printed list.

(6-9) Modification 9

According to one or more embodiments, the database server 320 may further store information on design of an air conditioning apparatus for each region and past calculation results. In this case, the user is able to use information, such as calculation results, on an air conditioning apparatus already installed in a different building of a similar structure, for design of an air conditioning apparatus which the user designs.

(6-10) Modification 10

According to one or more embodiments, the user inputs the length of each gas-side refrigerant connection pipe and the length of each liquid-side refrigerant connection pipe, in the input window W3 illustrated in FIG. 7F, by the design support program in the Web server 310 of the design support system 300. In the design support program in the Web server 310, a default pipe size is previously fixed in accordance with a capacity of a heat source-side unit and a capacity of a utilization-side unit.

In place of this configuration, the user may further input a pipe size (a pipe diameter), in the input window W3 illustrated in FIG. 7F.

(6-11) Modification 11

According to one or more embodiments, the control unit 19 of the air conditioning apparatus 1 has the configuration in which the heat source-side control unit 92, the relay-side control units 94A and 94B, and the utilization-side control units 93a, 93b, 93c, and 93d are connected via the transmission lines 95 and 96 as illustrated in FIG. 2A.

Figure 8:
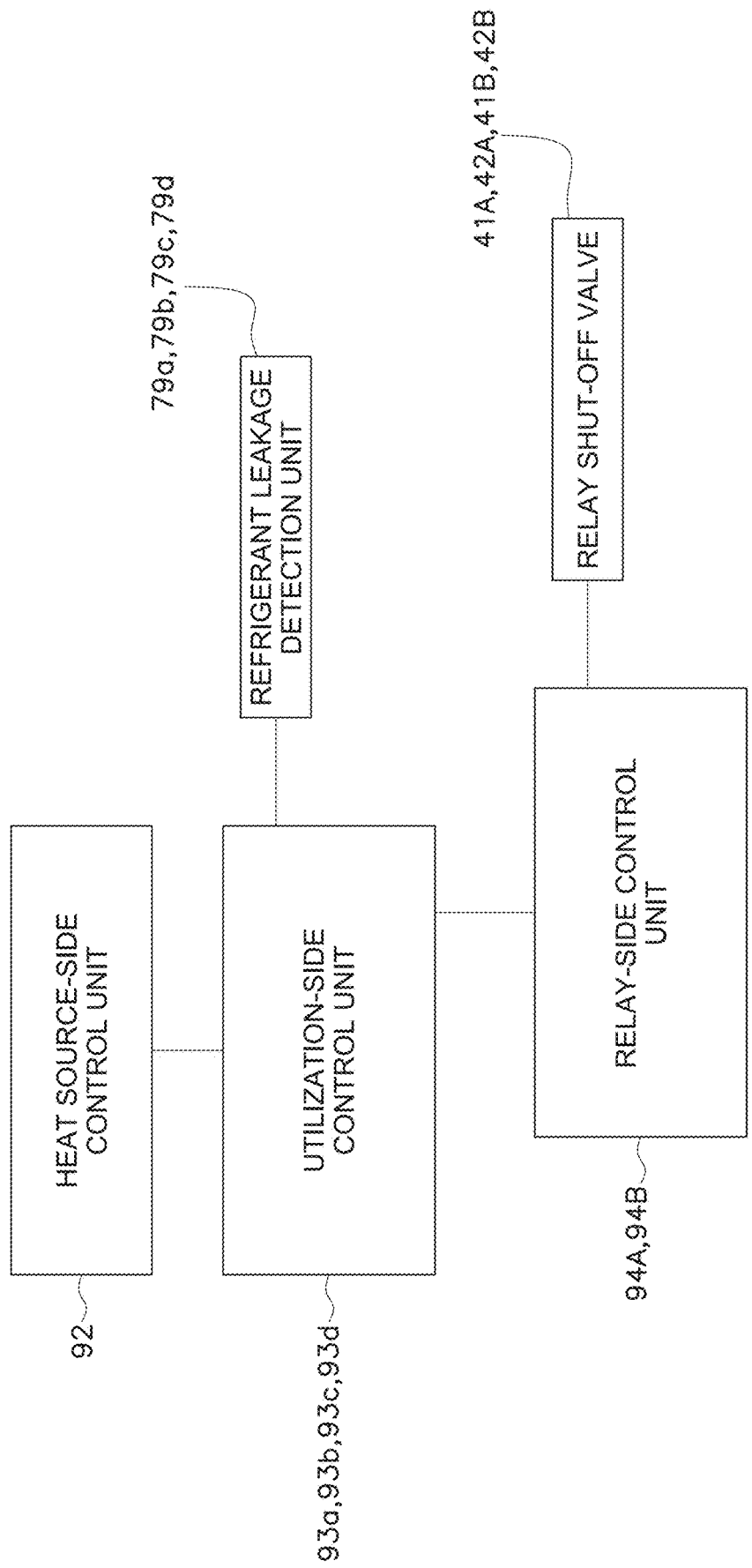
FIG. 8 is a control block diagram of a control unit in an air conditioning apparatus according to Modification 11.

The control unit 19 may alternatively employ a configuration in which the heat source-side control unit 92 and the relay-side control units 94A and 94B are connected via the utilization-side control units 93a, 93b, 93c, and 93d as illustrated in FIG. 8, in place of the configuration in which the heat source-side control unit 92 and the utilization-side control units 93a, 93b, 93c, and 93d are connected via the relay-side control units 94A and 94B as illustrated in FIG. 2A.

(6-12) Modification 12

According to one or more embodiments, each of the liquid relay shut-off valve 41A, the liquid relay shut-off valve 41B, the gas relay shut-off valve 42A, and the gas relay shut-off valve 42B in the air conditioning apparatus 1 is an electric expansion valve, but may alternatively be an electromagnetic valve that switches between an open state and a closed state.

(6-13) Modification 13

According to one or more embodiments, the air conditioning apparatus 1 includes the relay units 4A and 4B each having the liquid-side configuration and the gas-side configuration. The air conditioning apparatus 1 may alternatively include a relay unit having the liquid-side configuration and a relay unit having the gas-side configuration.

(6-14) Modification 14

According to one or more embodiments, the refrigerant circuit 10 in the air conditioning apparatus 1 is filled with R32 as a refrigerant. However, the technique regarding the arrangement of the relay unit described above is also effective in a case where the refrigerant circuit 10 is filled with another flammable refrigerant. The technique regarding the arrangement of the relay unit described above is also effective in a case where the refrigerant circuit 10 is filled with a single refrigerant of a mildly flammable refrigerant such as R32, R1234yf, R1234ze, or R744, or a mixed refrigerant containing this refrigerant. It should be noted that R32 is difluoromethane (HFC-32), R1234yf is 2,3,3,3-tetrafluoro-1-propene (HFO-1234yf), R1234ze is 1,3,3,3-tetrafluoro-1-propene (HFO-1234ze), and R744 is carbon dioxide.

A mildly flammable refrigerant, a lower flammability refrigerant, or a higher flammability refrigerant is supposed to be used as a refrigerant with which the refrigerant circuit 10 is filled and which flows through the refrigerant circuit 10. The mildly flammable refrigerant is classified as "Class 2L" in U.S. ANSI/ASHRAE Standard 34-2013. The lower flammability refrigerant is classified as "Class 2" in U.S. ANSI/ASHRAE Standard 34-2013. The higher flammability refrigerant is classified as "Class 3" in U.S. ANSI/ASHRAE Standard 34-2013.

U.S. ANSI/ASHRAE Standard 34-2013 is a standard of criteria for evaluation of flammable gas in the United States of America. Regulations on chemical materials are established in various countries around the world, and one of the regulations is the flammability of chemical materials. A standard is established for each country, and gas is classified into flammable gas and non-flammable gas under the criteria for evaluation in each country. In Japan, High Pressure Gas Safety Act defines an explosion limit value as one of criteria of flammable gas. Examples of the criteria of flammable gas may include ASHRAE34 and DOT as U.S. standards, EN378-1 and CLP Regulation as European standards, and GHS and ISO10156 as international standards. A European standard equivalent to U.S. ANSI/ASHRAE Standard 34-2013 is, for example, DIN EN378-1 (2008). DIN EN378-1 (2008) also specifies "Class 3: Higher Flammability", "Class 2: Lower Flammability", and "Class 2L: Mildly Flammable" as in U.S. ANSI/ASHRAE Standard 34-2013. Likewise, ISO/Final Draft International Standard (FDIS) 817 (2013) specifies "Class 3: Higher Flammability", "Class 2: Lower Flammability", and "Subclass 2L: Mildly Flammable".

(6-15) Modification 15

According to one or more embodiments, the refrigerant circuit 10 in the air conditioning apparatus 1 is filled with mildly flammable R32 as a refrigerant. However, the technique regarding the arrangement of the relay unit described above is also effective in a case of employing, for example, a toxic refrigerant or a refrigerant that may cause a shortage of oxygen concentration if the refrigerant leaks in large amounts. For example, this technique is also applicable in a case of employing carbon dioxide as a refrigerant.

(6-16) Modification 16

While one or more embodiments have been described herein above, it is to be appreciated that various changes in form and detail may be made without departing from the spirit and scope of the present disclosure presently or hereafter claimed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

2: heat source-side unit
3a: utilization-side unit (utilization-side unit in first utilization-side unit group)
3b: utilization-side unit (utilization-side unit in first utilization-side unit group)
3c: utilization-side unit
3d: utilization-side unit
3e: utilization-side unit
3f: utilization-side unit
4A: relay unit (refrigerant shut-off unit; first refrigerant shut-off unit)
4B: relay unit (refrigerant shut-off unit)
4F: relay unit (refrigerant shut-off unit)
5: liquid-side refrigerant connection pipe (connection pipe group)
5a: most-downstream pipe (first connection pipe group)
5ab: common pipe (first connection pipe group)
5b: most-downstream pipe (first connection pipe group)
6: gas-side refrigerant connection pipe (connection pipe group)
6a: most-downstream pipe (first connection pipe group)
6ab: common pipe (first connection pipe group)
6b: most-downstream pipe (first connection pipe group)
12: heat source-side refrigerant circuit (second refrigerant circuit)
13a: utilization-side refrigerant circuit (first refrigerant circuit)
13b: utilization-side refrigerant circuit (first refrigerant circuit)
81: first utilization-side unit group
300: design support system (support system)
312: information acquisition unit
318: useful information presentation unit (presentation unit)

The invention claimed is:

1. A support system that supports at least one of design or construction of a refrigerant cycle apparatus, the support system comprising:
a display; and
a server that comprises a storage and a processor that causes the display to display information, wherein
the refrigerant cycle apparatus comprises:
    utilization-side units each comprising a first refrigerant circuit;
    a heat source-side unit comprising a second refrigerant circuit;
    a connection pipe group that connects the first refrigerant circuit and the second refrigerant circuit; and
    a refrigerant shut-off unit that is disposed between the first refrigerant circuit and the second refrigerant circuit and that blocks a refrigerant flowing through the connection pipe group,
the utilization-side units comprising a first utilization-side unit group that is a group of N utilization-side units, wherein N is an integer equal to or more than two, wherein
the refrigerant shut-off unit comprises a first refrigerant shut-off unit that blocks a flow of the refrigerant between the first refrigerant circuit in the first utilization-side unit group and the second refrigerant circuit,
the first refrigerant shut-off unit is common to the group of N utilization-side units constituting the first utilization-side unit group,
the connection pipe group comprises a first connection pipe group that connects the first refrigerant circuit in the first utilization-side unit group and the first refrigerant shut-off unit,
the storage stores first information on arrangement of the first refrigerant shut-off unit, second information on each of the utilization-side units in the first utilization-side unit group, and third information on one of or both a length and an internal volume of the first connection pipe group,
the processor acquires, from the storage, the first information, the second information, or the third information,
when the processor acquires the first information, the second information, and the third information, the processor:
    determines, based on an allowable refrigerant leak amount of the refrigerant into a space where a corresponding one or more utilization-side units in the first utilization-side unit group is installed, whether the first information, the second information, and the third information are suitable for at least one of the design or the construction of the refrigerant cycle apparatus and causes the display to display a result of the determination; or
    calculates a first refrigerant amount and causes the display to display the first refrigerant amount,
the first refrigerant amount that is a sum of a second refrigerant amount in the first refrigerant circuit in the first utilization-side unit group and a third refrigerant amount in the first connection pipe group, and
a number of utilization side units in the first utilization-side unit group is less than a total number of the utilization-side units in the refrigerant cycle apparatus.

2. The support system according to claim 1, wherein the second information comprises:
    installation space information on the space where the corresponding one or more utilization-side units in the first utilization-side unit group is installed; and refrigerant amount information on the second refrigerant amount, and when the processor acquires the second information and the third information, the processor calculates the arrangement of the first refrigerant shut-off unit as the first information such that the first refrigerant amount is smaller than the allowable refrigerant leak amount.

3. The support system according to claim 2, wherein the refrigerant flowing through the first refrigerant circuit, the second refrigerant circuit, and the connection pipe group has flammability, and the allowable refrigerant leak amount is an allowable refrigerant leak amount in a first room having a smallest spatial volume among one or more rooms where one of the utilization-side units in the first utilization-side unit group is or the utilization-side units in the first utilization-side unit group are installed, and the allowable refrigerant leak amount in the first room is set such that a concentration of the refrigerant in the first room is within lower flammability limit (LFL) of refrigerant/safety factor.

4. The support system according to claim 3, wherein the refrigerant flowing through the first refrigerant circuit, the second refrigerant circuit, and the connection pipe group includes:

a mildly flammable refrigerant classified as "Class 2L" in U.S. ANSI/ASHRAE Standard 34-2013;

a lower flammability refrigerant classified as "Class 2" in U.S. ANSI/ASHRAE Standard 34-2013; or a higher flammability refrigerant classified as "Class 3" in U.S. ANSI/ASHRAE Standard 34-2013.

5. The support system according to claim 2, wherein the refrigerant flowing through the first refrigerant circuit, the second refrigerant circuit, and the connection pipe group includes:

a mildly flammable refrigerant classified as "Class 2L" in U.S. ANSI/ASHRAE Standard 34-2013;

a lower flammability refrigerant classified as "Class 2" in U.S. ANSI/ASHRAE Standard 34-2013; or a higher flammability refrigerant classified as "Class 3" in U.S. ANSI/ASHRAE Standard 34-2013.

6. The support system according to claim 1, wherein the second information comprises:

installation space information on the space where the corresponding one or more utilization-side units in the first utilization-side unit group is installed; and refrigerant amount information on the second refrigerant amount, and when the processor acquires the first information, the second information, and the third information, the processor determines whether the first refrigerant amount is smaller than the allowable refrigerant leak amount, and when the first refrigerant amount is smaller than the allowable refrigerant leak amount, the processor determines that the first information, the second information, and the third information are suitable for at least one of the design or the construction of the refrigerant cycle apparatus.

7. The support system according to claim 6, wherein the refrigerant flowing through the first refrigerant circuit, the second refrigerant circuit, and the connection pipe group has flammability, and the allowable refrigerant leak amount is an allowable refrigerant leak amount in a first room having a smallest spatial volume among one or more rooms where one of the utilization-side units in the first utilization-side unit group is or the utilization-side units in the first utilization-side unit group are installed, and the allowable refrigerant leak amount in the first room is set such that a concentration of the refrigerant in the first room is within LFL of refrigerant/safety factor.

8. The support system according to claim 6, wherein the refrigerant flowing through the first refrigerant circuit, the second refrigerant circuit, and the connection pipe group includes:

a mildly flammable refrigerant classified as "Class 2L" in U.S. ANSI/ASHRAE Standard 34-2013;

a lower flammability refrigerant classified as "Class 2" in U.S. ANSI/ASHRAE Standard 34-2013; or a higher flammability refrigerant classified as "Class 3" in U.S. ANSI/ASHRAE Standard 34-2013.

9. The support system according to claim 1, wherein when the processor acquires the first information, the second information, and the third information, the processor calculates the second refrigerant amount and the third refrigerant amount, based on a thermal environment of a place where the refrigerant cycle apparatus is installed and calculates the first refrigerant amount.

10. The support system according to claim 9, wherein the refrigerant flowing through the first refrigerant circuit, the second refrigerant circuit, and the connection pipe group includes:

a mildly flammable refrigerant classified as "Class 2L" in U.S. ANSI/ASHRAE Standard 34-2013;

a lower flammability refrigerant classified as "Class 2" in U.S. ANSI/ASHRAE Standard 34-2013; or a higher flammability refrigerant classified as "Class 3" in U.S. ANSI/ASHRAE Standard 34-2013.

11. The support system according to claim 1, wherein the refrigerant flowing through the first refrigerant circuit, the second refrigerant circuit, and the connection pipe group includes:

a mildly flammable refrigerant classified as "Class 2L" in U.S. ANSI/ASHRAE Standard 34-2013;

a lower flammability refrigerant classified as "Class 2" in U.S. ANSI/ASHRAE Standard 34-2013; or a higher flammability refrigerant classified as "Class 3" in U.S. ANSI/ASHRAE Standard 34-2013.

* * * * *